US009275043B2

(12) United States Patent
Tsuchida et al.

(10) Patent No.: US 9,275,043 B2
(45) Date of Patent: Mar. 1, 2016

(54) RELATIONSHIP INFORMATION EXPANSION APPARATUS, RELATIONSHIP INFORMATION EXPANSION METHOD, AND PROGRAM

(75) Inventors: Masaaki Tsuchida, Koganei (JP); Stijn De Saeger, Koganei (JP); Kentaro Torisawa, Koganei (JP); Masaki Murata, Koganei (JP); Junichi Kazama, Koganei (JP); Kow Kuroda, Koganei (JP)

(73) Assignee: National Institute of Information and Communications Technology, Tokyo (JP)

( * ) Notice: Subject to any disclaimer, the term of this patent is extended or adjusted under 35 U.S.C. 154(b) by 376 days.

(21) Appl. No.: 13/580,992

(22) PCT Filed: Jan. 5, 2011

(86) PCT No.: PCT/JP2011/050028
§ 371 (c)(1),
(2), (4) Date: Aug. 24, 2012

(87) PCT Pub. No.: WO2011/105113
PCT Pub. Date: Sep. 1, 2011

(65) Prior Publication Data
US 2012/0330976 A1    Dec. 27, 2012

(30) Foreign Application Priority Data
Feb. 26, 2010    (JP) .................................. 2010-042938

(51) Int. Cl.
*G06F 7/00* (2006.01)
*G06F 17/27* (2006.01)
(Continued)

(52) U.S. Cl.
CPC ........ *G06F 17/2795* (2013.01); *G06F 17/2276* (2013.01); *G06F 17/30604* (2013.01)

(58) Field of Classification Search
CPC .................................................. G06F 17/30604
USPC ............ 707/999.101, 999.102, 736, 750, 759
See application file for complete search history.

(56) References Cited

U.S. PATENT DOCUMENTS 5,617,567 A * 4/1997 Doktor .................................. 1/1
6,076,051 A * 6/2000 Messerly et al. .................. 704/9
(Continued)

FOREIGN PATENT DOCUMENTS

JP    2008-225565 A    9/2008

OTHER PUBLICATIONS

Ishikawa, D., et al., "Generation and Verification of a hypothesis by Analogical Reasoning using Causal Relationships in Patent Document—Life Science Fields as an Example-" Journal of Japan Society of Information and Knowledge 2008;17(3):164-181.
(Continued)

*Primary Examiner* — Eliyah S Harper
(74) *Attorney, Agent, or Firm* — Cermak Nakajima & McGowan LLP; Tomoko Nakajima

(57) ABSTRACT

A relationship information expansion apparatus capable of acquiring a new relationship based on a relationship information piece including two or more language expressions having a semantic relationship is provided. The relationship information expansion apparatus generates a candidate expanded relationship information piece in which at least one language expression included in the relationship information piece was replaced with a similar language expression, and acquires a score that indicates a probability that the candidate expanded relationship information piece has a semantic relationship. The relationship information expansion apparatus selects an expanded relationship information piece, which is a candidate expanded relationship information piece having a high score among candidate expanded relationship information pieces.

7 Claims, 15 Drawing Sheets

(51) Int. Cl.
*G06F 17/22* (2006.01)
*G06F 17/30* (2006.01)

(56) References Cited

U.S. PATENT DOCUMENTS

| | | | | |
|---|---|---|---|---|
| 6,618,733 | B1* | 9/2003 | White et al. | 707/739 |
| 2002/0154177 | A1* | 10/2002 | Barksdale et al. | 345/853 |
| 2005/0154713 | A1* | 7/2005 | Glover et al. | 707/3 |
| 2006/0122973 | A1* | 6/2006 | Berg et al. | 707/3 |
| 2007/0156393 | A1* | 7/2007 | Todhunter et al. | 704/9 |
| 2008/0097994 | A1* | 4/2008 | Teramoto et al. | 707/7 |
| 2008/0243820 | A1* | 10/2008 | Chang et al. | 707/5 |
| 2009/0234832 | A1* | 9/2009 | Gao et al. | 707/5 |
| 2009/0249250 | A1* | 10/2009 | Gajula et al. | 715/810 |
| 2011/0093188 | A1* | 4/2011 | Barkai et al. | 701/200 |
| 2011/0106821 | A1* | 5/2011 | Hassanzadeh et al. | 707/749 |

OTHER PUBLICATIONS

Pantel, P., et al., "Espresso: Levergaing Generic Patterns for Automatically Harvesting Semantic Relations," Proceedings of the 21st International Conference on Computational Linguistics and 44th Annual Meeting of the ACL, Jul. 2006, Sydney, Australia, pp. 113-120.

International Search Report for PCT Patent App. No. PCT/JP2011/050028 (Mar. 29, 2011).

Office Action from Japanese Patent App. No. 2010-042938 (Jul. 23, 2013) with partial English language translation thereof.

* cited by examiner

FIG.5

| Similarity information piece |
|---|
| myocardial infarction, cerebral infarction, stroke, depression |
| death, death from sickness, sudden death |
| ⋮ |

FIG.6

| Relationship information piece ID | Candidate expanded relationship information piece | Co-occurrence score |
|---|---|---|
| 1 | <cerebral infarction, death> | — |
| 1 | <stroke, death> | — |
| 1 | <depression, death> | — |
| 1 | <myocardial infarction, death from sickness> | — |
| 1 | <myocardial infarction, sudden death> | — |
| 1 | <cerebral infarction, death from sickness> | — |
| 1 | <cerebral infarction, sudden death> | — |
| 1 | <stroke, death from sickness> | — |
| 1 | <stroke, sudden death> | — |
| 1 | <depression, death from sickness> | — |
| 1 | <depression, sudden death> | — |

FIG.7

| Relationship information piece ID | Candidate expanded relationship information piece | Co-occurrence score |
|---|---|---|
| 1 | <cerebral infarction, death> | 540 |
| 1 | <stroke, death> | 190 |
| 1 | <depression, death> | 280 |
| 1 | <myocardial infarction, death from sickness> | 220 |
| 1 | <myocardial infarction, sudden death> | 360 |
| 1 | <cerebral infarction, death from sickness> | 410 |
| 1 | <cerebral infarction, sudden death> | 470 |
| 1 | <stroke, death from sickness> | 120 |
| 1 | <stroke, sudden death> | 150 |
| 1 | <depression, death from sickness> | 20 |
| 1 | <depression, sudden death> | 16 |

FIG.10

| Correspondence information | |
|---|---|
| Type identification information | Co-occurring language expression |
| Cause | cause, reason, factor, ... |
| Food material | material, recipe, ... |
| ⋮ | ⋮ |

FIG.11

| Type identification information | Similarity information piece |
|---|---|
| local specialty | Ehime, Kagawa |
| local specialty | Kagawa, Tokushima |
| local specialty | Tokushima, Kochi |
| ⋮ | ⋮ |
| cause | death, sudden death |
| ⋮ | ⋮ |

FIG.12

| Type identification information | Language expression that is not replacement target | Similarity information piece |
|---|---|---|
| cause | death | myocardial infarction, cerebral infarction |
| cause | death | myocardial infarction, stroke |
| ⋮ | ⋮ | ⋮ |
| local specialty | mandarin orange | Ehime, Kagawa |
| ⋮ | ⋮ | ⋮ |

RELATIONSHIP INFORMATION EXPANSION APPARATUS, RELATIONSHIP INFORMATION EXPANSION METHOD, AND PROGRAM

This application is a national phase entry under 35 U.S.C. §371 of PCT Patent Application No. PCT/JP2011/050028, filed on Jan. 5, 2011, which claims priority under 35 U.S.C. §119 to Japanese Patent Application No. 2010-042938, filed Feb. 26, 2010, both of which are incorporated by reference.

TECHNICAL FIELD

The present invention relates to a relationship information expansion apparatus and the like for expanding a relationship information piece that includes two or more language expressions having a semantic relationship.

BACKGROUND ART

Conventionally, acquisition of a relationship information piece that includes two or more language expressions having a semantic relationship has been conducted. Here, "semantic relationship" refers to, for example, a causal relationship, a superordinate-subordinate relationship, or the like. Accordingly, the relationship information piece is, for example, "cause <myocardial infarction, death>", which indicates that the cause of death is myocardial infarction, "superordinate <medicine, headache remedies>", which indicates that the superordinate word of headache remedies is medicine, or the like. As a method for acquiring such a relationship information piece, the method disclosed in Non-Patent Literature 1 is available, for example. With Non-Patent Literature 1, for example, an expression pattern "X is a cause of Y" is used as a clue, and the relationship information piece can be acquired by obtaining X and Y portions from a document. Meanwhile, with the method using such a pattern, a problem arises in that only the relationship described using the pattern to be the clue can be acquired.

As a method for solving that problem, a method for acquiring relationship information using analogy is disclosed in, for example, Non-Patent Literature 2.

PRIOR ART DOCUMENT

Non-Patent Literature

[Non-Patent Literature 1] P. Pantel, M. Pennacchiotti, "Espresso: Leveraging generic patterns for automatically harvesting semantic relations", In Proc. of the $21^{st}$ COLING and $44^{th}$ ACL (COLING-ACL-06), pp. 113-120, 2006
[Non-Patent Literature 2] Daisuke Ishikawa, Hidehiro Ishizuka, Yuzuru Fujiwara "Generation and Verification of a hypothesis by Analogical Reasoning using Causal Relationships in Patent Documents: Life Science Fields as an Example", Japan Society of Information and Knowledge Journal, Vol. 17, No. 3, pp. 164-181, 2007

DISCLOSURE OF INVENTION

Problem to be Solved by the Invention

Meanwhile, Non-Patent Literature 2 has a problem in that when a language expression included in a relationship information piece is replaced, it can be replaced only with an expression having a common radical. For example, "peptide" can be replaced with "antimicrobial peptide", but cannot be replaced with an expression that does not have a common radical. There is also a problem in that the relationship information piece after the replacement may include an inappropriate expression.

The present invention was made to solve the foregoing problems, and it is an object thereof to provide a relationship information expansion apparatus and the like capable of expanding, in the case of expanding an existing relationship information piece, a language expression included in a relationship information piece further into expressions that do not have a common radical, and expanding the relationship information piece to a relationship information piece having an appropriate semantic relationship.

Means for Solving the Problems

To achieve the above-described object, the relationship information expansion apparatus according to the present invention includes: a relationship information storage unit in which a relationship information piece including two or more language expressions having a semantic relationship is stored; a similarity information storage unit in which two or more similarity information pieces each including two or more similar language expressions are stored; a candidate expanded relationship information storage unit in which a candidate expanded relationship information piece, which is the relationship information piece in which at least one language expression was replaced with a similar language expression, is stored; a candidate expanded relationship information generation unit for generating a candidate expanded relationship information piece in which at least one language expression included in the relationship information piece stored in the relationship information storage unit was replaced with a language expression similar to the at least one language expression using the similarity information pieces, and accumulating the candidate expanded relationship information piece in the candidate expanded relationship information storage unit; a score acquisition unit for acquiring a score that indicates a probability that the candidate expanded relationship information piece stored in the candidate expanded relationship information storage unit has a semantic relationship; and a selection unit for selecting, using the score acquired by the score acquisition unit, an expanded relationship information piece, which is a candidate expanded relationship information piece having a high score among candidate expanded relationship information pieces stored in the candidate expanded relationship information storage unit.

With this configuration, a language expression is replaced with a similar language expression, and it is therefore possible to replace a language expression with one that does not have a common radical. Furthermore, because the score for each candidate expanded relationship information piece is acquired and a candidate expanded relationship information piece having a high score is selected, the expansion relationship information piece, which is the selection result, can appropriately have a semantic relationship.

Also, in the relationship information expansion apparatus according to the present invention, the score acquisition unit may acquire a co-occurrence score, which is a score related to co-occurrence of the two or more language expressions included in the candidate expanded relationship information piece.

Because language expressions having a semantic relationship are highly likely to co-occur with each other, it is possible with the above-described configuration to make appropriate selection by selecting a candidate expanded relationship information piece having a high co-occurrence score.

Also, in the relationship information expansion apparatus according to the present invention, the score acquisition unit may acquire a route score, which is a score that takes a higher value as the candidate expanded relationship information piece is obtained from more relationship information pieces.

Because an appropriate expansion relationship information is considered to be obtained from many relationship information pieces, it is possible with the above-described configuration to make appropriate selection by selecting a candidate expanded relationship information piece having a high route score.

Also, in the relationship information expansion apparatus according to the present invention, the score acquisition unit may acquire a co-occurrence score, which is a score related to co-occurrence of the two or more language expressions included in the candidate expanded relationship information piece, and a route score, which is a score that takes a higher value as the candidate expanded relationship information piece is obtained from more relationship information pieces, and the selection unit selects a candidate expanded relationship information piece having a high co-occurrence score and a high route score.

With the above-described configuration, it is possible to make more appropriate selection by selecting a language expression having a high co-occurrence score and a high route score.

Also, in the relationship information expansion apparatus according to the present invention, the score acquisition unit may acquire a co-occurrence score that takes a higher score when the two or more language expressions included in the candidate expanded relationship information piece co-occur with a co-occurring language expression, which is a language expression having a high co-occurrence degree with two or more language expressions included in each relationship information piece having a semantic relationship of the same type as the semantic relationship of the relationship information piece used at the time of generation of the candidate expanded relationship information piece, than when only the two or more language expressions included in the candidate expanded relationship information piece co-occur with one another.

With the co-occurrence score in the above-described configuration, it is possible to acquire a co-occurrence score that takes a higher value as the candidate expanded relationship information piece has a more similar relationship to that of the relationship information piece used for generation of the candidate expanded relationship information piece.

Also, in the relationship information expansion apparatus according to the present invention, the relationship information piece may also include type identification information, which is information for identifying a type of the semantic relationship among the two or more language expressions included in the relationship information piece, the candidate expanded relationship information generation unit may generate a candidate expanded relationship information piece including the type identification information included in the relationship information piece used to generate the candidate expanded relationship information piece, the relationship information expansion apparatus may further includes a correspondence information storage unit in which one or more correspondence information pieces each including the type identification information and one or more co-occurring languages expressions corresponding to the type identification information and corresponding to the type of the semantic relationship identified by the type identification information are stored, and the score acquisition unit may acquire the co-occurrence score that takes a higher value when the two or more language expressions included in the candidate expanded relationship information piece co-occur with each co-occurring language expression corresponding to the type identification information included in the candidate expanded relationship information piece, than when only the two or more language expressions included in the candidate expanded relationship information piece co-occur with one another.

With the above-described configuration, it is possible to acquire a co-occurrence score as described above using the correspondence information.

Also, in the relationship information expansion apparatus according to the present invention, the score acquisition unit may perform machine learning in which a language expression that co-occurs with two or more language expressions included in a group of those two or more language expressions is used at least as a feature, and in which a value of the feature and existence or non-existence of a semantic relationship in the group of the two or more language expressions are used as training data, and acquires a co-occurrence score according to a probability degree, which is an output in a case where the two or more language expressions included in the candidate expanded relationship information piece are input.

With the above-described configuration, it is possible to acquire a co-occurrence score as described above using the machine learning.

Also, in the relationship information expansion apparatus according to the present invention, the route score may be a score that takes a higher value as the candidate expanded relationship information piece is obtained from more relationship information pieces, and takes a higher value as, in the replacement at the time of generation of the candidate expanded relationship information piece, the language expressions before the replacement and the language expression after the replacement are more similar to each other.

Because an appropriate expanded relationship information is considered to be obtained with a high similarity degree from many relationship information pieces, it is possible with the above-described configuration to acquire a route score also in consideration with the similarity degree, and make more appropriate selection.

Also, in the relationship information expansion apparatus according to the present invention, a relationship information piece and a candidate expanded relationship information piece each may include two language expressions, which are a first language expression and a second language expression, the score acquisition unit may acquire, for a candidate expanded relationship information piece, a route score, which is a value of an increasing function with an argument that is one or more arbitrary calculated values among a first calculated value, a second calculated value, and a third calculated value, the first calculated value being a sum of similarity degrees between the first language expression in each relationship information piece whose second language expression agrees with that in the candidate expanded relationship information piece and the first language expression in the candidate expanded relationship information piece, the second calculated value being a sum of similarity degrees between the second language expression in each relationship information piece whose first language expression agrees with that in the candidate expanded relationship information piece and the second language expression in the candidate expanded relationship information piece, and the third calculated value being a sum of products of similarity degrees between the first language expression in each relationship information piece stored in the relationship information storage unit and that in the candidate expanded relationship information piece and similarity degrees between the second language expression in each relationship information piece stored in the relationship information storage unit and that in the candidate expanded relationship information piece.

With the above-described configuration, it is possible, in the case where the relationship information piece includes two language expressions, to acquire a route score using one or more arbitrary calculated values among the first to third calculated values.

Also, in the relationship information expansion apparatus according to the present invention, the relationship information piece may also include type identification information, which is an information piece for identifying a type of the semantic relationship among the two or more language expressions included in the relationship information piece, the similarity information storage unit may store the type identification information and the similarity information piece corresponding to the type identification information, and the candidate expanded relationship information generation unit, when replacing at least one language expression included in a relationship information piece stored in the relationship information storage unit, may perform replacement using the similarity information corresponding to the type identification information included in the relationship information piece.

With the above-described configuration, it is possible to generate the candidate expanded relationship information piece using the similarity information suitable for the relationship information piece. Accordingly, the accuracy of the candidate expanded relationship information piece becomes higher, and as a result, the accuracy of the expanded relationship information piece can also become higher.

Further, in the relationship information expansion apparatus according to the present invention, the relationship information piece also includes type identification information, which is information for identifying a type of the semantic relationship between the two or more language expressions included in the relationship information piece, the similarity information storage unit stores the type identification information, one or more language expressions that are not replacement targets, and a similarity information piece corresponding to the type identification information and the one or more language expressions that are not replacement target, and the candidate expanded relationship information generation unit may perform, when replacing one of the language expressions included in the relationship information piece stored in the relationship information storage unit, the replacement using the similarity information corresponding to the type identification information included in the relationship information piece and the language expressions that are not replacement targets.

With the above-described configuration, it is possible to generate the candidate expanded relationship information piece using the similarity information suitable for the relationship information piece and the language expressions that are not replacement targets. Accordingly, the accuracy of the candidate expanded relationship information piece becomes higher, and as a result, the accuracy of the expanded relationship information piece can also become higher.

Effect of the Invention

With the relationship information expansion apparatus and the like according to the present invention, it is possible to acquire a new, appropriate semantic relationship using an existing relationship information piece.

BRIEF DESCRIPTION OF THE DRAWINGS

FIG. 5 is a diagram showing an example of similarity information pieces according to Embodiment 1.

FIG. 6 is a diagram showing an example of candidate expanded relationship information pieces and the like according to Embodiment 1.

FIG. 7 is a diagram showing an example of candidate expanded relationship information pieces and the like according to Embodiment 1.

FIG. 10 is a diagram showing an example of correspondence information pieces according to Embodiment 1.

FIG. 11 is a diagram showing an example of information stored in a similarity information storage unit according to Embodiment 1.

FIG. 12 is a diagram showing an example of information stored in the similarity information storage unit according to Embodiment 1.

BEST MODE FOR CARRYING OUT THE INVENTION

A relationship information expansion apparatus according to the present invention will be hereinafter described using an embodiment. Note that in the following embodiment, components and steps assigned the same signs are the same or corresponding ones, and repeated explanation may be omitted.

Embodiment 1

The relationship information expansion apparatus according to Embodiment 1 of the present invention will be described with reference to the drawings. The relationship information expansion apparatus according to the present embodiment replaces at least one language expression included in an existing relationship information piece with a similar language expression, acquires scores for information pieces after the replacement, and expands the relationship information piece by selecting an information piece having a high score.

Figure 1:
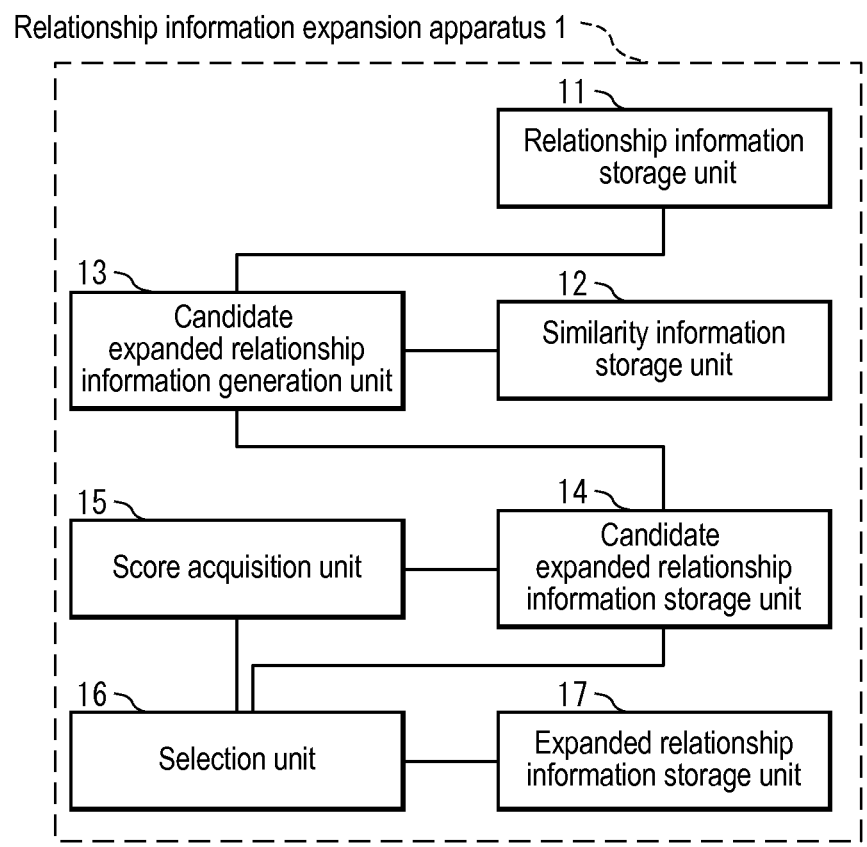
FIG. 1 is a block diagram showing a configuration of a relationship information expansion apparatus according to Embodiment 1 of the present invention.

FIG. 1 is a block diagram showing a configuration of a relationship information expansion apparatus 1 according to the present embodiment. The relationship information expansion apparatus 1 according to the present embodiment is provided with a relationship information storage unit 11, a similarity information storage unit 12, a candidate expanded relationship information generation unit 13, a candidate expanded relationship information storage unit 14, a score acquisition unit 15, a selection unit 16, and an expanded relationship information storage unit 17.

In the relationship information storage unit 11, a relationship information piece that includes two or more language expressions having a semantic relationship is stored. There is no limitation on the number of relationship information pieces stored in the relationship information storage unit 11, but in the case of acquiring a route score with the score acquisition unit 15, which will be described later, it is preferable that a plurality of relationship information pieces are stored. Meanwhile, in the case of acquiring only a co-occurrence score, the relationship information storage unit 11 may store a single relationship information piece, or may store a plurality of relationship information pieces. Note that a language expression is usually a word (e.g., "health" etc.), but it may alternatively be an array of continuous words (e.g., a word array such as "walking in the early morning", etc.). Also, that word may be, for example, an independent word (An independent word is a free-standing word that expresses a distinct unit of meaning (a concept) in natural language), and particularly may be a noun word. Also, in the case where the word is a noun, a language expression may be nouns jointed by particles or prepositions (e.g., "watashi-no-tomodachi" (Japanese expression meaning 'friend of mine'), "friend of mine" etc.) Also, each relationship information piece usually includes two language expressions, but it may also include three or more language expressions. Note that in the present embodiment, the case where each relationship information piece mainly includes two language expressions will be described. Also, in the present embodiment, the relationship information piece is denoted as <the first language expression, the second language expression>.

Also, there is no limitation on the type of semantic relationship, as long as it is some kind of semantic relationship. For example, it may be a superordinate-subordinate relationship (e.g., <beverage, coffee> etc.), a cause-and-result relationship (e.g., <cerebral infarction, death> etc.), a rival or antonym relationship (e.g., <up, down>, <high speed, low speed> etc.), a relationship between a product and a manufacturer (e.g., <vacuum machine, Company A> etc.), a relationship between an event and a method (e.g., <explosion, bomb> etc.), a relationship between an event and a tool (e.g., <lecture, textbook> etc.), a relationship between an event and a prevention thereof (e.g., <disease, medicine>), a relationship between a goods and material (e.g., <can, aluminum> etc.), a relationship between the whole and a part (e.g., <bicycle, saddle> etc.), a relationship between an event or a goods and a trouble (e.g., <bicycle, puncture> etc.), a relationship between an event and a countermeasure (e.g., <rain, umbrella>, etc.), a relationship between an event and essential goods thereof (e.g., <taking a commemorative picture, camera> etc.), a relationship between places in a short distance (e.g., <Osaka, Kobe> etc.), a relationship between a place and a local product or a landmark (e.g., <Tokyo, Tokyo Tower> etc.), a relationship between a dish and an ingredient contained therein (e.g., <stew, potato> etc.), or any other kinds of relationship. Also, the semantic relationship may refer to, for example, one language expression and another language expression having a relationship, which may indicate existence of a relationship, a related person, a related temple/shrine, an effect of a food material, an effective food material, an unexpected food material, an effect of a dish, an effective dish, an unexpected dish, an effect of a nutrient, an effective nutrient, a constituent, a season, a food material in season, a substitute food, a synonym, a Buddha statue/God, an owner temple, a worshipping shrine, or the like. Note that the semantic relationship may be a relationship among three or more language expressions. For example, it may be a relationship among a diet, a medical examination result, and a disease (e.g., <high calorie, hyperglycemia, diabetes>, <excessive salt, high blood pressure, stroke> etc.).

Also, each relationship information piece may, but does not necessarily have to, include information for identifying the semantic relationship associated with the relationship information piece. In the former case, for example, the relationship information piece may be "cause <cerebral infarction, death>". In this case, "cause" is the information for identifying the semantic relationship, and it is indicated that the cause of death is cerebral infarction.

Also, the relationship information piece stored in the relationship information storage unit 11 may be manually created, or may be automatically acquired. In the latter case, for example, the abovementioned method in Non-Patent Literature 1 may be used.

Note that the language expression included in the relationship information piece may be a language expression itself, or may be information with which the language expression can be specified. In the latter case, the language expression included in the relationship information piece may be, for example, a pointer or an address that indicates an area where the language expression is stored. This also applies to other information.

In the similarity information storage unit 12, two or more similarity information pieces are stored. Each similarity information piece is information including two or more similar language expressions. Each similarity information piece may include two language expressions, or may include three or more language expressions. Note that the language expressions included in a single similarity information piece are similar to each other. Also, each similarity information piece may, but does not necessarily have to, includes a similarity degree that indicates a degree of similarity between the language expressions. Also, the similarity information pieces may be manually created, or may be automatically acquired.

The candidate expanded relationship information generation unit 13 generates a candidate expanded relationship information piece in which at least one language expression included in a relationship information piece stored in the relationship information storage unit 11 is replaced with a language expression similar to the at least one language expression using the similarity information piece. Then, the candidate expanded relationship information generation unit 13 accumulates the generated candidate expanded relationship information piece in the candidate expanded relationship information storage unit 14. Note that the candidate expanded relationship information generation unit 13 replaces at least one language expression included in a relationship information piece with a similar language expression. Accordingly, the candidate expanded relationship information generation unit 13 may replace a single language expression included in a relationship information piece with a similar language expression, or may replace two or more language expressions included in a relationship information piece respectively with similar language expressions. Also, the candidate expanded relationship information generation unit 13 may replace all language expressions included in a relationship information piece respectively with similar language expressions. Also, if there are two or more language expressions similar to a language expression included in a relationship information piece, the candidate expanded relationship information generation unit 13 may generate different candidate expanded relationship information pieces in which the language expression included in the relationship information piece is replaced respectively with the two or more language expressions.

Note that the candidate expanded relationship information generation unit 13 possibly generates the same candidate expanded relationship information piece from different relationship information pieces. For example, it applies to the case where the candidate expanded relationship information generation unit 13 generates, from different relationship information pieces <cerebral infarction, death> and <myocardial infarction, death>, the same candidate expanded relationship information piece <stroke, death>, and the like. In this case, for example, unique processing may be performed on the generated candidate expanded relationship information pieces to eliminate the redundancy in the candidate expanded relationship information piece, or may be configured not to accumulate, at the time of accumulation of a candidate expanded relationship information piece, the same candidate expanded relationship information piece as an already accumulated one.

Also, the candidate expanded relationship information generation unit 13 may, but does not necessarily have to, accumulate the candidate expanded relationship information piece that is the same information as the relationship information piece in the candidate expanded relationship information storage unit 14. In the former case, the candidate expanded relationship information generation unit 13 may further positively accumulate each relationship information piece stored in the relationship information storage unit 11 as it is in the candidate expanded relationship information storage unit 14.

In the candidate expanded relationship information storage unit 14, the candidate expanded relationship information pieces are stored. Each candidate expanded relationship information piece is, as described above, a relationship information piece in which at least one language expression is replace with a similar language expression. The candidate expanded relationship information piece stored in the candidate expanded relationship information storage unit 14 is generated by the candidate expanded relationship information generation unit 13, as described above.

The score acquisition unit 15 acquires a score that indicates a probability that each candidate expanded relationship information piece stored in the candidate expanded relationship information storage unit 14 has a semantic relationship. This score may be a score related to co-occurrence of two or more language expressions included in each candidate expanded relationship information piece. That is, the score acquisition unit 15 may acquire a co-occurrence score, which is a score related to co-occurrence of two or more language expressions included in each candidate expanded relationship information piece. Also, this score may be a score that takes a higher value as a candidate expanded relationship information piece is obtained from more relationship information pieces. That is, the score acquisition unit 15 may acquire a route score, which is a score that takes a higher value as a candidate expanded relationship information piece is obtained from more relationship information pieces. This route score may be a score that takes a higher value as a candidate expanded relationship information piece is obtained from more relationship information pieces, and takes a higher value as the language expression after the replacement is more similar to the language expression before the replacement in the replacement at the time of generation of the candidate expanded relationship information piece. Note that "language expression before the replacement" is a language expression that is a replacement target. Also, the score acquisition unit 15 may acquire either the co-occurrence score or the route score, or may acquire both of them.

Here, the co-occurrence score acquisition method and the route score acquisition method will be described.

(1) Co-Occurrence Score Acquisition Method

First, co-occurrence will be described. "A language expression A co-occurs with a language expression B" means that the language expression A and the language expression B simultaneously appear within a scope of a predetermined length (e.g., within the scope of a single sentence, within the scope of a single paragraph, within the scope of a single page, within the scope of a single document, within the scope of a single web page, etc.). A co-occurrence score refers to a scale indicating that co-occurrence. The scales of indicating co-occurrence include, for example, a co-occurrence frequency, a co-occurrence rate, a Simpson coefficient, a cosine distance, a Dice coefficient, mutual information content, and the like. A co-occurrence frequency between the language expression A and the language expression B is the number of times when the language expressions A and B simultaneously appear within a scope of a predetermined length. A co-occurrence rate is the number obtained by dividing the co-occurrence frequency by the number obtained by subtracting the co-occurrence frequency ("Z") from the sum of the number of times when the language expression A appears ("X") and the number of times when the language expression B appears ("Y") (i.e., X+Y−Z). Also, a Simpson coefficient is obtained by using the minimum values of X and Y as a denominator of the co-occurrence rate. Also, a cosine distance is obtained by using a square root of an absolute value of the product of X and Y as a denominator of the co-occurrence rate. Note that those scales indicating co-occurrence are already known. For example, refer to the following literature. Needless to say, a co-occurrence score may also be acquired using co-occurrence scales other than the abovementioned scales.

Literature: Akiko Aizawa "Similarity Scale Based on Co-occurrence", Operations Research, Management Science 52 (11), pp. 706-712, November 2007

Note that a database containing a large number of documents is necessary to calculate the co-occurrence score. This database may be held by the relationship information expansion apparatus 1, or may exist outside the apparatus, for example. In the latter case, for example, the database may be a website, or a database held by a predetermined server. Also, processing such as search for the co-occurrence score calculation may be performed by the score acquisition unit 15 accessing the database, or the score acquisition unit 15 may only deliver two or more language expressions to an external device or server and receive a co-occurrence score generated by this external device or server.

Also, a co-occurrence score for every possible combination of language expressions may be calculated and stored in advance, and thus the co-occurrence score for certain language expressions A and B may be acquired from the stored information. Specifically, the language expression A, the language expression B, and the co-occurrence scores for those language expressions may be stored in association with one another, and the score acquisition unit 15 may read the co-occurrence score associated with the language expressions A and B when acquiring the co-occurrence score for the language expressions A and B. Thus, acquisition of a co-occurrence score may be calculation of the co-occurrence score, or may be reading of the co-occurrence score.

Also, in the case where a candidate expanded relationship information piece includes three or more language expressions, the score acquisition unit 15 acquires the co-occurrence scores for those three or more language expressions. That is, the score acquisition unit 15 acquires the co-occurrence scores for all language expressions included in each candidate expanded relationship information piece. If the co-occurrence score can be acquired also for three or more language expressions, such as the co-occurrence frequency or the co-occurrence rate, the score acquisition unit 15 acquires the co-occurrence score corresponding to the three or more language expressions. Meanwhile, if the co-occurrence score is defined only for two language expressions, such as a Dice coefficient or a mutual information content, the score acquisition unit 15 may prepare all possible pairs of two language expressions among the three or more language expressions, acquire co-occurrence scales such as Dice coefficients for all those pairs, and may use, as the co-occurrence score, a value of a function with arguments that are the co-occurrence scales of all those pairs. Note that this function is an increasing function for each argument. For example, the function may be an average, sum, product, or the like of the co-occurrence scales of all pairs.

(2) Route Score Acquisition Method

Next, a route score will be described. Here, a route score will be described, which is a score that takes a higher value as a candidate expanded relationship information piece is obtained from more relationship information pieces, and that takes a higher value as, in the replacement at the time of generation of the candidate expanded relationship information piece, the language expression before the replacement and the language expression after the replacement are more similar to each other. Also, the case where two language expressions are included in each of the relationship information piece and the candidate expanded relationship information piece will be described. With regard to the relationship information piece and the candidate expanded relationship information piece, a language expression of the first item is referred to as "first language expression", and a language expression of the second item is referred to as "second language expression". That is, in the case where the relationship information piece or the candidate expanded relationship information piece is <X, Y>, the first language expression is X, and the second language expression is Y.

A candidate expanded relationship information piece is assumed to be $<f_h, s_h>$. Here, $f_h$ and $s_h$ are language expressions. A set of relationship information pieces each provided with two language expressions having a semantic relationship is assumed to be $R_{given}$. It is assumed that $R_{given} = \{r_1 = <f_1, s_1>, \ldots, r_n = <f_n, s_n>\}$. A first calculated value $S_{FA}(f_h, s_h)$, a second calculated value $S_{SA}(f_h, s_h)$, and a third calculated value $S_{FULL}(f_h, s_h)$ are calculated by the following expressions.

Note that the first calculated value $S_{FA}(f_h, s_h)$ is a sum of similarity degrees between the first language expression in each relationship information piece whose second language expression agrees with the second language expression $s_h$ in the candidate expanded relationship information piece $<f_h, s_h>$ and the first language expression $f_h$ in the candidate expanded relationship information piece $<f_h, s_h>$. The sum is, as indicated by the following expression, a sum related to the set of the first language expressions in the respective relationship information pieces whose second language expressions agree with the second language expression $s_h$ in the candidate expanded relationship information piece $<f_h, s_h>$. Accordingly, it can also be said that the first calculated value $S_{FA}(f_h, s_h)$ is obtained by specifying the set of the first language expressions included in the relationship information pieces whose second language expressions agree with the second language expression $s_h$ in the candidate expanded relationship information piece $<f_h, s_h>$, and calculating the sum, related to the respective elements of the set, of the similarity degrees between the respective first language expressions included in the set and the first language expression $f_h$ in the candidate expanded relationship information piece $<f_h, s_h>$.

Also, the second calculated value $S_{SA}(f_h, s_h)$ is a sum of similarity degrees between the second language expression in each relationship information piece whose first language expression agrees with the first language expression $f_h$ in the candidate expanded relationship information piece $<f_h, s_h>$ and the second language expression $s_h$ in the candidate expanded relationship information piece $<f_h, s_h>$. The sum is, as indicated by the following expression, a sum related to the set of the second language expressions in the respective relationship information pieces whose first language expressions agree with the first language expression $f_h$ in the candidate expanded relationship information piece $<f_h, s_h>$. Accordingly, it can also be said that the second calculated value $S_{SA}(f_h, s_h)$ is obtained by specifying the set of second first language expressions included in the relationship information pieces whose first language expressions agree with the first language expression $f_h$ in the candidate expanded relationship information piece $<f_h, s_h>$, and calculating the sum, related to the respective elements of the set, of the similarity degrees between the respective second language expressions included in the set and the second language expression $s_h$ in the candidate expanded relationship information piece $<f_h, s_h>$.

Also, the third calculated value $S_{FULL}(f_h, s_h)$ is a sum of products of similarity degrees between the first language expression in each relationship information piece stored in the relationship information storage unit 11 and that in the candidate expanded relationship information piece $<f_h, s_h>$ and similarity degrees between the second language expression in each relationship information piece stored in the relationship information storage unit 11 and that in the candidate expanded relationship information piece $<f_h, s_h>$. This sum is, as indicated by the following expression, a sum related to the set of pairs of the first language expressions and the second language expressions in $R_{given}$. Accordingly, it can also be said that the third calculated value $S_{FULL}(f_h, s_h)$ is obtained by calculating, for each relationship information piece included in the set of pairs of the language expressions in the respective relationship information pieces included in P a product of the similarity degree between the first language expression and the first language expression $f_h$ in the candidate expanded relationship information piece $<f_h, s_h>$ and the similarity degree between the second language expression and the second language expression $s_h$ in the candidate expanded relationship information piece $<f_h, s_h>$, and calculating the sum, related to the respective elements of the set, of the products of the similarity degrees.

[Expression 1]

$$S_{FA}(f_h, s_h) = \sum_{f_i \in FA(s_h)} \text{sim}(f_h, f_i)$$

$$S_{SA}(f_h, s_h) = \sum_{s_i \in SA(f_h)} \text{sim}(s_h, s_i)$$

$$S_{FULL}(f_h, s_h) = \sum_{(f_i, s_i) \in R_{given}} \text{sim}(f_h, f_i)\text{sim}(s_h, s_i)$$

Here, FA(s) is the set of the first language expressions in the relationship information pieces whose second language expression is "s" in $R_{given}$. Also, SA(f) is the set of the second language expressions in the relationship information pieces whose first language expression is "f" in $R_{given}$. "sim" is a similarity degree. This similarity degree may be, for example, an automatically calculated one, such as the similarity degree in the following literature, or a manually set similarity degree may be used, or two language expressions registered as expressions having a similar meaning, such as quasi-synonyms or synonyms, may be considered to have a high similarity degree. Also, in the case of using a dictionary in which language expressions are organized by using a semantic hierarchical structure or a tree structure, higher layers in the structure are traced from two language expressions, and those language expressions may be set to have a higher similarity degree as the number of layers that are traced to arrive at the first common point is smaller, and have, on the contrary, a lower similarity degree as this number is larger. Examples of such a dictionary for the Japanese language include "Classified Lexicon" (National Institute for Japanese Language and Linguistics), "GoiTaikei—A Japanese Lexicon" (Iwanami Shoten), "Kadokawa Synonym Japanese Dictionary" (Kadokawa Group Publishing), "Thesaurus" (Taishukan Publishing), "EDR Concept System Dictionary" (EDR Project), "Thesaurus" (Jungle), "JST Scientific and Technological Thesaurus" (JST Science and Technology Agency), and the like. Also, examples for English include "Roget's Thesaurus of English Words and Phrases", "WordNet", "MeSH (Medical Subject Headings)", and the like.

Literature: Junichi Kazama, Stijn De Saeger, Kentaro Torisawa, Masaki Murata, "Creation of Large-Scale Synonym List Using Probabilistic Clustering of Syntactic Dependency", The Association for Natural Language Processing 15th Annual Meeting, pp. 84-87, March 2009

Note that if, when acquiring the above-described calculated values, the similarity information pieces each including the similarity degree stored in the similarity information storage unit 12 is used, in some cases the language expressions A and B are not similar to each other and therefore are not included in the similarity information pieces stored in the similarity information storage unit 12, and then sim(A, B) is unknown. In that case, it is assumed that sim(A, B)=0.

The score acquisition unit 15 may acquire the route score for the candidate expanded relationship information piece $<f_h, s_h>$ by calculating a value of an increasing function with an argument that is one or more arbitrary calculated values among the above-described first calculated value $S_{FA}(f_h, s_h)$, second calculated value $S_{SA}(f_h, s_h)$, and third calculated value $S_{FULL}(f_h, s_h)$. Note that the increasing function is an increasing function for each argument, and may be, for example, $S^{sum}(f_h, s_h)$, which is a sum of the first to third calculated values, or may be $S^{prod}(f_h, s_h)$, which is a product of the first to third calculated values. $S^{sum}$ becomes high in the case where any one of the first to third calculated values is high. Meanwhile, $S^{prod}$ becomes high in the case where all of the first to third calculated values are high. That is, $S^{prod}$ is different from $S^{sum}$ on the point that the candidate expanded relationship information piece generated based on the both language expressions in a well-balanced manner is considered to take a good value. Note that in the calculation of $S^{prod}$, a sufficiently small value is added to each calculated value to avoid $S^{prod}$ becoming zero.

Note that in the above expressions, if it is assumed that sim(A, B) is a function that becomes "1" when the language expressions A and B are similar to each other, and becomes "0" when the language expressions A and B are not similar to each other, the route score is a route score that takes a higher value as the candidate expanded relationship information piece is obtained from more relationship information pieces. That is, it is a score in which the similarity degree is not taken into considered. Accordingly, the above-described calculated values may be thus calculated. For example, when acquiring sim (A, B), if it is indicated that the language expressions A and B are similar to each other by the similarity information piece stored in the similarity information storage unit 12, the score acquisition unit 15 may assume sim (A, B)=1, and if it is indicated that the language expressions A and B are not similar to each other, the score acquisition unit 15 may assume sim (A, B)=0.

Also, calculation of the route score in the case where each of the relationship information pieces and the candidate expanded relationship information pieces includes m language expressions is simply described. Note that m is an integer equal to or larger than 2. Here, a candidate expanded relationship information piece is assumed to be $<f_h^1, f_h^2, \ldots, f_h^m>$. $f_h^1, f_h^2$, and the like are the language expressions included in the candidate expanded relationship information piece. Also, a set $R_{given}$ of the relationship information pieces is as below. Note that $f_h^j, f_i^j$ and the like are referred to as jth language expression. $R_{given} = \{r_1 = <f_1^1, f_1^2, f_1^m>, r_2 = <f_2^1, f_2^2, f_2^m>, \ldots, r_n = r_n = <f_n^1, f_n^2, \ldots, f_n^m>\}$ In that case, a calculated value $S_{k1k2 \ldots kj}(f_h^1, \ldots, f_h^m)$ is as below.

[Expression 2]

$$S_{k1k2\ldots kj}(f_h^1, \ldots, f_h^m) = \sum_{(f_i^{k1}, f_i^{k2}, \ldots, f_i^{kj}) \in M} \text{sim}(f_h^{k1}, f_i^{k1})\text{sim}(f_h^{k2}, f_i^{k2}) \ldots \text{sim}(f_h^{kj}, f_i^{kj})$$

Here, the calculated value $S_{k1k2 \ldots kj}(f_h^1, \ldots, f_h^m)$ is a calculated value of the route score in the case where the candidate expanded relationship information piece is generated by replacing the k1st language expression, the k2nd language expression, . . . , and the kjth language expression. Note that the set M in the above expression will be described. Initially, it is assumed that the set M1={1, 2, 3, . . . , m} and the set M2={k1, k2, k3, . . . kj}. Elements k1, k2, k3, . . . kj in the set M2 are elements whose number is one or more and equal to or less than m that are selected so as not to overlap with elements of the set M1. Also, it is assumed that k1<k2< . . . <kj. Also, the set M3 is assumed to be a set obtained by eliminating the elements included in the set M2 from the set M1. This set M3 is assumed to be M3={p1, p2, . . . , pm-j}. Then, in $R_{given}$, M is a set of groups of the k1st term, the k2nd term, . . . , the kjth term where the p1st term is $f_h^{p1}$, the p2nd term is $f_h^{p2}$, . . . , the pm-jth term is $f_h^{pm-j}$. Here, in the case of j=m, M3 is an empty set, and M is $R_{given}$. The score acquisition unit 15 can acquire the route score for the candidate expanded relationship information piece including the m language expressions by calculating a value of an increasing function (this increasing function is assumed to be an increasing function for each argument) with an argument that is a calculated value for one or more arbitrary M2s, among all M2s at the values ranging from j=1 to j=m. This increasing function may be, for example, a sum of calculated values obtained for all M2s, or may be a product of calculated values obtained for all M2s.

Although the two scores, namely the co-occurrence score and the route score have been described here, the score acquisition unit 15 may acquire other scores indicating a probability that the candidate expanded relationship information piece has a semantic relationship.

Also, in the case of acquiring both the co-occurrence score and the route score, the score acquisition unit 15 may acquire the co-occurrence score and the route score for every candidate expanded relationship information piece stored in the candidate expanded relationship information storage unit 14, or may acquire one of those two scores, and acquire, only for the candidate expanded relationship information pieces whose score obtained is high, the other score. In the present embodiment, the latter case will be mainly described.

Also, the scores acquired by the score acquisition unit 15 may be accumulated in association with the candidate expanded relationship information pieces. Specifically, the score acquisition unit 15 may accumulate the acquired scores in association with the candidate expanded relationship information pieces corresponding to those scores stored in the candidate expanded relationship information storage unit 14, or may accumulate the acquired scores in a recording medium, which is not shown in the figure, in association with information pieces for identifying the candidate expanded relationship information pieces corresponding to those scores.

The selection unit 16 selects, using the scores acquired by the score acquisition unit 15, candidate expanded relationship information pieces each having a high score among the candidate expanded relationship information pieces stored in the candidate expanded relationship information storage unit 14. The candidate expanded relationship information pieces selected by the selection unit 16 are expanded relationship information pieces. In the case where the score acquisition unit 15 acquires both the co-occurrence scores and the route scores, the selection unit 16 may select candidate expanded relationship information pieces each having a high co-occurrence score and a high route score. Note that the candidate expanded relationship information pieces each having a high score may be, for example, the candidate expanded relationship information pieces each having a score that is equal to or larger than a threshold value, or may be a predetermined number of candidate expanded relationship information pieces in descending order of score. Note that both of those two conditions may be used in combination. For example, the candidate expanded relationship information pieces each having a high score may be the candidate expanded relationship information pieces each having a score equal to or larger than a threshold value, and also the predetermined number of the candidate expanded relationship information pieces or less in descending order of score. The threshold value may be, for example, a value obtained by multiplying the largest value of the score by a predetermined number smaller than 1 (e.g., 0.9, 0.8, etc.), or may be a predetermined value.

The selection unit 16 may accumulate the selected candidate expanded relationship information pieces in the expanded relationship information storage unit 17, which will be described later, or may set, in the candidate expanded relationship information storage unit 14, identification information for indicating an expanded relationship information piece, such as a flag, for each selected candidate expanded relationship information piece. That is, there is no limitation on the method for indicating the selection result, as long as the candidate expanded relationship information pieces can be distinguished between the selected ones and the unselected ones. Note that the present embodiment will be described for the former case, that is, the case where the expanded relationship information pieces, which are the selection result, are accumulated in the expanded relationship information storage unit 17.

Also, in the case where the candidate expanded relationship information piece that is the same information as the relationship information piece is stored in the candidate expanded relationship information storage unit 14, the selection unit 16 may, but does not necessarily have to, select the expanded relationship information piece that is the same the relationship information piece. In the latter case, the selection unit 16 may be configured to refer to the relationship information pieces stored in the relationship information storage unit 11 so as not to select the candidate expanded relationship information pieces that agree with those relationship information pieces.

In the expanded relationship information storage unit 17, the expanded relationship information pieces, which are the candidate expanded relationship information pieces selected by the selection unit 16, are stored. These expanded relationship information pieces are the ones accumulated by the selection unit 16, as described above.

Note that there is no limitation on the process by which the relationship information pieces and the two or more similarity information pieces are stored respectively in the relationship information storage unit 11 and the similarity information storage unit 12. For example, the relationship information pieces and the like may be stored in the relationship information storage unit 11 and the like via a recording medium, or the relationship information pieces and the like transmitted via a communication line or the like may be stored in the relationship information storage unit 11 and the like, or the relationship information pieces and the like input via an input device may be stored in the relationship information storage unit 11 and the like. Also, the storage in the relationship information storage unit 11, the similarity information storage unit 12, the candidate expanded relationship information storage unit 14, and the expanded relationship information storage unit 17 may be temporal storage in a RAM or the like, or may be a long-term storage. Also, each of the relationship information storage unit 11, the similarity information storage unit 12, the candidate expanded relationship information storage unit 14, and the expanded relationship information storage unit 17 can be implemented by a predetermined recording medium (e.g., a semiconductor memory, a magnetic disk, an optical disk, or the like).

Also, among the relationship information storage unit 11, the similarity information storage unit 12, the candidate expanded relationship information storage unit 14, and the expanded relationship information storage unit 17, two or more arbitrary storage units may be implemented by the same recording medium, or may be implemented by separate recording mediums. In the former case, for example, the area storing the relationship information pieces is the relationship information storage unit 11, and the area storing the similarity information pieces is the similarity information storage unit 12.

Next, an operation of the relationship information expansion apparatus 1 according to the present embodiment will be described using the flowchart in FIG. 2.

(step S101) The candidate expanded relationship information generation unit 13 generates a candidate expanded relationship information piece in which at least one language expression in a relationship information piece stored in the relationship information storage unit 11 is replaced with a similar language expression using the similarity information pieces stored in the similarity information storage unit 12, and accumulates the generated candidate expanded relationship information piece in the candidate expanded relationship information storage unit 14. Note that the detail of this process will be described using the flowchart in FIG. 3.

(step S102) The score acquisition unit 15 acquires a score for each candidate expanded relationship information piece stored in the candidate expanded relationship information storage unit 14. Note that the details of this process will be described later using the flowchart in FIG. 4.

(step S103) The selection unit 16 selects an expanded relationship information piece, which is the candidate expanded relationship information piece having a high score acquired by the score acquisition unit 15. As described above, this selection may be performed by, for example, selecting the candidate expanded relationship information piece having a score equal to or larger than a threshold value, or by selecting a predetermined number of the candidate expanded relationship information pieces in descending order of score. Then, the selection unit 16 accumulates the expanded relationship information piece, which is the selection result, in the expanded relationship information storage unit 17. Thus a series of processes for expanding the relationship information piece ends.

Figure 2:
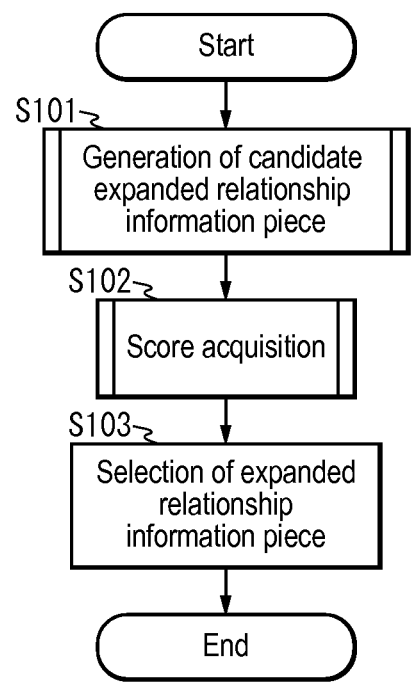
FIG. 2 is a flowchart showing an operation of the relationship information expansion apparatus according to Embodiment 1.
Figure 3:
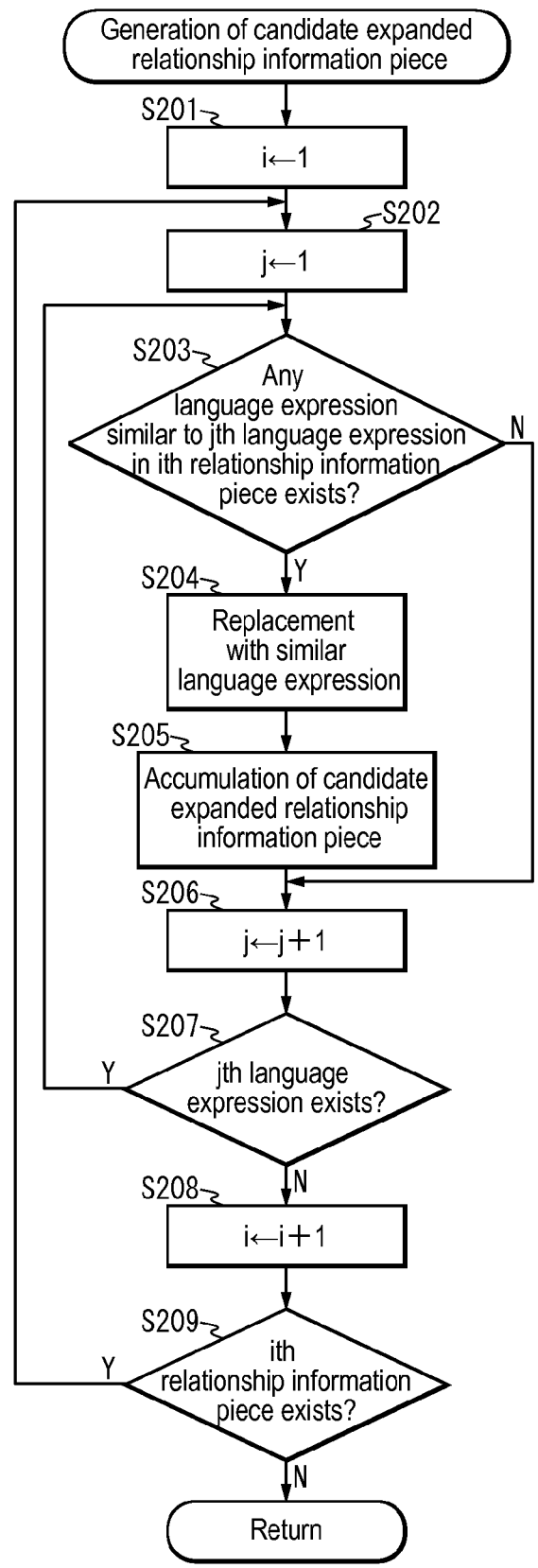
FIG. 3 is a flowchart showing an operation of the relationship information expansion apparatus according to Embodiment 1.

FIG. 3 is a flowchart showing the detail of the candidate expanded relationship information generation process (step S101) in the flowchart in FIG. 2.

(step S201) The candidate expanded relationship information generation unit 13 sets a counter i to 1.

(step S201) The candidate expanded relationship information generation unit 13 sets a counter j to 1.

(step S203) The candidate expanded relationship information generation unit 13 determines whether or not any language expression similar to the jth language expression included in the ith relationship information piece stored in the relationship information storage unit 11 is stored in the similarity information storage unit 12. If the language expression similar to the jth language expression included in the ith relationship information piece is stored in the similarity information storage unit 12, the processing proceeds to step S204, and if not, the processing proceeds to step S206. Note that this determination may be performed by, for example, using the jth language expression as a search string and searching for this search string in the similarity information storage unit 12. If there is a search hit, it is assumed that a language expression similar to the jth language expression is stored, and if not, it is assumed that no language expression similar to the jth language expression is stored.

(step S204) The candidate expanded relationship information generation unit 13 reads out the language expression similar to the jth language expression included in the ith relationship information piece from the similarity information storage unit 12. Specifically, the reading may be performed by reading, from the similarity information piece that hit in the search in step S203, a language expression other than the jth language expression included in the ith relationship information piece. The read language expression may be temporarily stored in a recording medium, which is not shown in the figure. Then, the candidate expanded relationship information generation unit 13 generates a candidate expanded relationship information piece in which the jth language expression included in the ith relationship information piece is replaced with the language expression read out from the similarity information storage unit 12. For example, in the case where two or more language expressions are read out from the similarity information storage unit 12, the candidate expanded relationship information generation unit 13 generates two or more candidate expanded relationship information pieces in which the jth language expression included in the ith relationship information piece is replaced with the two or more language expressions, respectively.

Note that in step S204, the candidate expanded relationship information generation unit 13 may perform, with respect to the ith relationship information piece, replacement of the jth language expression also on a candidate expanded relationship information piece in which at least any one of the 1st to (j−1)th language expressions is replaced. For example, in the case where the relationship information piece includes three language expressions and j=3, if, regarding the ith relationship information piece, there are a candidate expanded relationship information piece in which only the 1st language expression is replaced, a candidate expanded relationship information piece in which only the 2nd language expression is replaced, and a candidate expanded relationship in which both the 1st and 2nd language expressions are replaced, the candidate expanded relationship information generation unit 13 may perform processing for replacing the jth (=3rd) language expression with a similar language expression on those three candidate expanded relationship information pieces.

(step S205) The candidate expanded relationship information generation unit 13 accumulates the candidate expanded relationship information piece after the replacement in the candidate expanded relationship information storage unit 14. Note that in step S204, in the case where, regarding the ith relationship information piece, the replacement is performed also on a candidate expanded relationship information piece that has already been subjected to the replacement, it is preferable to perform the accumulation in step S205 so as to be able to understand that the candidate expanded relationship information piece that is the accumulation target is associated with the ith relationship information piece. The candidate expanded relationship information generation unit 13 may accumulate the candidate expanded relationship information piece in association with a value of the counter i, for example.

Also, the candidate expanded relationship information generation unit 13 may repeatedly perform the processes in step S204 and step S205 every time a single candidate expanded relationship information piece is generated. For example, in the case where there are two or more language expressions similar to the jth language expression included in the ith relationship information piece, the candidate expanded relationship information generation unit 13 may accumulate the candidate expanded relationship information piece after the replacement in the candidate expanded relationship information storage unit 14 every time the jth language expression is replaced with each language expression.

(step S206) The candidate expanded relationship information generation unit 13 increments the counter j by 1.

(step S207) The candidate expanded relationship information generation unit 13 determines whether or not the jth language expression exists in the ith relationship information piece. If the jth language expression exists, the processing returns to step S203, and if not, the processing proceeds to step S208. Note that because the number of language expressions included in a relationship information piece is predetermined, for example, this number may be stored in a recording medium, which is not shown in the figure, and the candidate expanded relationship information generation unit 13 may perform the process in step S207 by comparing the number of language expressions stored in the recording medium with the value of the counter j. In this case, if j>(the stored number of language expressions), the processing proceeds to step S208.

(step S208) The candidate expanded relationship information generation unit 13 increments the counter i by 1.

(step S209) The candidate expanded relationship information generation unit 13 determines whether or not the ith relationship information piece exists in the relationship information storage unit 11. If the ith relationship information piece exists, the processing returns to step S202, and if not, the processing returns to the flowchart in FIG. 2.

Figure 4:
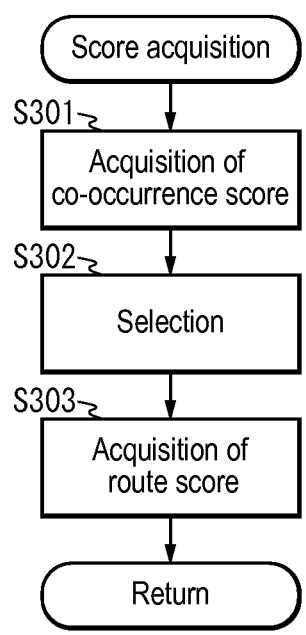
FIG. 4 is a flowchart showing an operation of the relationship information expansion apparatus according to Embodiment 1.

FIG. 4 is a flowchart showing the detail of the process (step S102) for acquiring the score in the flowchart in FIG. 2. Note that with the flowchart in FIG. 4, the case of acquiring the co-occurrence scores, then provisionally selecting candidate expanded relationship information pieces each having a high co-occurrence score, and acquiring the route scores only for the selected candidate expanded relationship information pieces will be described.

(step S301) The score acquisition unit 15 acquires the co-occurrence scores for all candidate expanded relationship information pieces stored in the candidate expanded relationship information storage unit 14.

(step S302) The selection unit 16 provisionally selects the candidate expanded relationship information pieces each having a high co-occurrence score among the scores acquired in step S301. The selection unit 16 may accumulate, for example, the selected candidate expanded relationship information pieces in the candidate expanded relationship information storage unit 14 or a recording medium, which is not shown in the figure, or may set, with respect to each of the provisionally selected candidate expanded relationship information pieces stored in the candidate expanded relationship information storage unit 14, an identification information, such as a flag, indicating that the candidate expanded relationship information piece is provisionally selected.

(step S303) The score acquisition unit 15 acquires the route scores for all candidate expanded relationship information pieces provisionally selected in step S302.

By thus acquiring the co-occurrence scores, provisionally selecting the candidate expanded relationship information pieces each having a high co-occurrence score, and acquiring the route scores for the provisionally selected candidate expanded relationship information pieces, the number of the candidate expanded relationship information pieces for which the route scores are acquire can be reduced. Usually, a load of the route score acquisition process is heavier than that of the co-occurrence score acquisition process, and therefore, the load of score acquisition can be reduced by performing score acquisition in this order. In this case, in the selection process in step S103, the candidate expanded relationship information pieces each having a high route score may be selected.

Note that the score acquisition method in the flowchart in FIG. 4 is an example, and alternatively, both the co-occurrence scores and the route scores may be acquired for all candidate expanded relationship information pieces stored in the candidate expanded relationship information storage unit 14. In this case, in the selection process in step S103, the candidate expanded relationship information pieces each having a high co-occurrence score and a high route score may be selected. Also, in the case of performing selection using only one of the co-occurrence score and the route score, only the scores used in the selection may be acquired for all candidate expanded relationship information pieces stored in the candidate expanded relationship information storage unit 14 in the flowchart in FIG. 4. In this case, in the selection process in step S103, the candidate expanded relationship information pieces each having a high score used in the selection (the co-occurrence score or the route score) may be selected. Also, reversing the order in the flowchart in FIG. 4, the route scores may be initially acquired, the candidate expanded relationship information pieces each having a high route score may be provisionally selected, and the co-occurrence scores may be acquired only for the selected candidate expanded relationship information pieces.

Next, the operation of the relationship information expansion apparatus 1 according to the present embodiment will be described using a simple specific example. In this specific example, the selection is performed using only the co-occurrence scores. Also, in this specific example, only the relationship information piece <myocardial infarction, death>, which indicates that the cause of death is myocardial infarction, is stored in the relationship information storage unit 11. Also, in the similarity information storage unit 12, the similarity information pieces shown in FIG. 5 are stored. In FIG. 5, a single record is a single similarity information piece. Note that the language expressions included in a single similarity information piece are similar to one another. For example, myocardial infarction, cerebral infarction, stroke, and depression are language expressions similar to one another.

Upon relationship information expanding processing being started, initially the candidate expanded relationship information generation unit 13 performs the process for generating candidate expanded relationship information piece from the relationship information piece <myocardial infarction, death> stored in the relationship information storage unit 11 (step S101). Specifically, the candidate expanded relationship information generation unit 13 searches for the first language expression "myocardial infarction" in the relationship information piece, which serves as a search string, in the similarity information storage unit 12. As a result, "myocardial infarction" included in the first record hits, and so the candidate expanded relationship information generation unit 13 reads out the language expressions other than the search string, namely "cerebral infarction", "stroke", and "depression" from the first record and accumulates the read language expressions in a recording medium, which is not shown in the figure, and also determines that language expressions similar to the first language expression "myocardial infarction" in the first relationship information piece exit (steps S201 to S203). Then, the candidate expanded relationship information generation unit 13 generates candidate expanded relationship information pieces in which the first language expression "myocardial infarction" in the relationship information piece <myocardial infarction, death> is replaced with the similar language expressions "cerebral infarction", "stroke", and "depression", respectively, and accumulates those candidate expanded relationship information pieces in association with the value of the counter i at this time point in the candidate expanded relationship information storage unit 14 (step S204 and S205). The first to third records in FIG. 6 include the candidate expanded relationship information pieces accumulated as above. Note that in FIG. 6, a relationship information piece ID is a value of the counter i. The co-occurrence scores are acquired later by the score acquisition unit 15, and therefore the columns therefor are empty at this stage. After that, the candidate expanded relationship information generation unit 13 reads out, from the similarity information storage unit 12, and accumulates the language expressions "death from sickness" and "sudden death" that are similar to the second language expression "death" in the relationship information piece <myocardial infarction, death>, and also determines that language expressions similar to the second language expression "death" in the first relationship information piece exist (steps S206, S207, S203). Then, the candidate expanded relationship information generation unit 13 generates candidate expanded relationship information pieces in which the second language expression "death" in the relationship information piece <myocardial infarction, death> and in the candidate expanded relationship information pieces <cerebral infarction, death>, <stroke, death>, and <depression, death> corresponding to the relationship information piece ID "1" that have been accumulated so far is replaced with the similar language expressions "death from sickness" and "sudden death", respectively, and accumulates those candidate expanded relationship information pieces in association with the value of the counter i at this time point in the candidate expanded relationship information storage unit 14 (steps S204 and S205). As a result, the information stored in the candidate expanded relationship information storage unit 14 is as shown in FIG. 6.

Next, the score acquisition unit 15 acquires the co-occurrence scores for the two language expressions included in the candidate expanded relationship information pieces shown in FIG. 6, respectively, and accumulates the acquired scores in association with the candidate expanded relationship information pieces in the candidate expanded relationship information storage unit 14 (steps S102 and S301). It is assumed that as a result, the information stored in the candidate expanded relationship information storage unit 14 are as shown in FIG. 7. Note that that those co-occurrence scores are assumed to be the co-occurrence frequencies. After that, the selection unit 16 performs the selection using the co-occurrence scores. It is assumed that in this selection, the threshold value is set to 50, and the candidate expanded relationship information pieces each having a co-occurrence score higher than the threshold value are selected as the expanded relationship information pieces. Then, the selection unit 16 selects the expanded relationship information pieces other than <depression, death from sickness> and <depression, sudden death> from among the expanded relationship information pieces shown in FIG. 7, and accumulates the selected expanded relationship information pieces in the expanded relationship information storage unit 17 (step S103). As a result, in the expanded relationship information storage unit 17, the expanded relationship information pieces that are the first to ninth candidate expanded relationship information pieces in FIG. 7 are stored. Thus the relationship information piece <myocardial infarction, death> can be expanded to the expanded relationship information pieces <cerebral infarction, death> and the like. Note that the co-occurrence scores and the like shown in this specific example are those shown for describing the detail of the operations of the relationship information expansion apparatus 1 according to the present embodiment, and are not data acquired using actual documents or the like.

Note that this specific example has been described for the case where two or more language expressions similar to each other are included in a single similarity information piece, but the present invention does not need to be limited thereto. The similarity information piece may be, for example, an information piece including two similar language expressions. In this case, for example, the first record in FIG. 5 is separated into six similarity information pieces, namely a pair of myocardial infarction and cerebral infarction, a pair of myocardial infarction and stroke, a pair of myocardial infarction and depression, a pair of cerebral infarction and stroke, a pair of cerebral infarction and depression, and a pair of stroke and depression.

Next, an experimental example of the relationship information expansion apparatus 1 according to the present embodiment will be described. In this experimental example, accuracy of expanded relationship information pieces obtained from a relationship information piece <X, Y> having a relationship where "X is a cause of Y", and whether or not any relationship pieces that have been difficult to acquire with conventional pattern-based methods are able to be acquired are evaluated. Note that in this experimental example, each language expression is a noun or continuous nouns.

Initially, the evaluation method will be described. The evaluation was performed by three evaluators. An expanded relationship information piece was evaluated as "correct" in the case where (1) it was determined to be correct based on common sense, or (2) even if it was not determined to be correct based on common sense, one or more evidences supporting the correctness were found on the web. Note that "to be correct" means that the relationship where "X is a cause of Y" exists. Also, the accuracy was measured based on agreement by two or more (lenient) and by three (strict) from the three evaluators.

Note that in the case (2), the evaluation was performed by obtaining 10 pages by AND search for "X, Y, cause" using YahooAPI with respect to a single relationship, extracting, from each page, up to three text segments in each of which "X, Y, cause" exist within 200 characters, and presenting up to 30 (=10×3) segments to the evaluators. An expanded relationship information piece is correct if at least one of the up to 30 segments is determined to be reasonable by the evaluators.

In the present experiment, a total of 400 expanded relationship information pieces were evaluated by each evaluator, while the Kappa coefficient among the evaluators was 0.629 in average. It is generally said that a Kappa coefficient of 0.6 or larger is "a considerably good agreement rate", and therefore it can be said that the agreement rate in the determination among the evaluators is generally good.

Next, the similarity information pieces used in this experimental example will be described. For the synonym acquisition, a list with similarity degrees of synonyms of about 500,000 nouns created by the method in Kazama, et al. Literature mentioned above (the context synonym database Version 1, old. 500 k-2 k. data. published in ALAGIN Forum) was used.

With the method of Kazama, et al., roughly two types of syntactic dependency relationships dep, namely (particle, verb) and (of, noun) of each noun n were collected from a large-volume corpus, and P(c), P(n|c), and P(dep|c) are estimated by an EM algorithm (the probability model is equivalent to PLSI) based on the technique in Torisawa Literature (refer to the following literature):

[Expression 3]

$$P(n, \text{dep}) = \sum_{c_i \in C} P(c_i) P(n \mid c_i) P(\text{dep} \mid c_i).$$

Thus, a smoothing effect can be expected compared with the case of using dep directly as a feature. Next, P(c|n) is calculated from the above parameters, and the similarity degree between nouns n1 and n2 is obtained as a Jensen-Shannon (JS) divergence for P(c|n1) and P(c|n2). A JS divergence is a type of a distance between probability distributions, and is calculated by the following expression.

[Expression 4]

$$JS(P1\|P2) = \frac{1}{2}(KL(P1\|P_{mean}) + KL(P2\|P_{mean}))$$

Here, P1 and P2 are probability distributions, KL(P1||P2) is a KL divergence, and $P_{mean}$ is a means in the case of regarding P1 and P2 as vectors. The JS divergence takes a value from 0 to 1, and a smaller value indicates that the words are more similar to each other. Therefore, the similarity degree between the words n1 and n2 is as below:

sim(n1,n2)=1−JS(P(c|n1)∥P(c|n2))  [Expression 5]

Lastly, respectively for each of all pairs in a possible word set, a word pair that fulfills two conditions, namely (A) sim (n1, n2) is equal to or larger than the threshold value $T_{sim}$, and (B) each of the words in the pair is included in the other's top M words in terms of similarity degree, was acquired as a similarity information piece. In this experimental example, the similarity information was generated with the threshold value $T_{sim}$=0.7 and M=20. Note that each similarity information piece used in the experimental example includes a pair of similar words and the similarity degree of this word pair.
Literature: K. Torisawa, "An Unsupervised Method for Canonicalization of Japanese Postpositions", In Proc. of the 6th NLPRS, pp. 211-218, 2001

Also, in this experimental example, the co-occurrence score of word co-occurrence frequency was used. As the word co-occurrence frequency, the data on the frequency of documents in which a pair of words co-occurs within four continuous sentences calculated for all pairs in about 500,000 nouns, which is the same as above, in about 100 million documents (the word co-occurrence frequency database Version 1, 500 k-500 k. 100 m-docs. w4. data. published in ALAGIN Forum) was used. The threshold value for the co-occurrence score of the co-occurrence frequency was $T_{cooc}$=20. These parameters such as the thresholds were set empirically so that when selection using the co-occurrence scores is performed, the amount of generated relationships is about 10 times the amount of the relationship information piece.

Next, the relationship information pieces used in this experimental example will be described. As the relationship information pieces, top 10,000 relationships among relationships obtained by the method in De Saeger et al. Literature (refer to the following literature) were used after removing obviously inappropriate relationships therefrom. The data used in the pattern learning for the relationship acquisition by the method in De Saeger et al. literature are about 50 million documents, and a target word set includes about 500,000 nouns, which is the same as above. Among the pattern-based methods, the above-described method, whose details are described in the literature and omitted here, is considered to have the highest level of coverage because, in this method, seed patterns are input, relationships are re-acquired using all patterns from which the same two words as those in the seed patterns can be extracted, and those relationships are ranked. When the accuracy of the relationship information pieces were measured with the similar criteria to the above-described evaluation method, the lenient accuracy was 0.80 and the strict accuracy was 0.70. That is, estimate is performed from the relationship information piece containing noise.

Here, it should be noted that this evaluation, which is different from the method in De Saeger et al. Literature, has a tendency of taking relatively lower values compared with De Saeger at al. Literature.

Literature: S. De Saeger, K. Torisawa, J. Kazama, K. Kuroda, M. Murata, "Large Scale Relation Acquisition Using Class Dependent Patterns", In Proc. of the $9^{th}$ ICDM, pp. 764-769, 2009

As a result of generating the candidate expanded relationship information pieces using those similarity information pieces, relationship information pieces, and the word co-occurrence frequencies and performing the selection using the co-occurrence score, 102,290 new relationships (candidate expanded relationship information pieces) were generated from 10,000 relationship information pieces.

Figure 8:
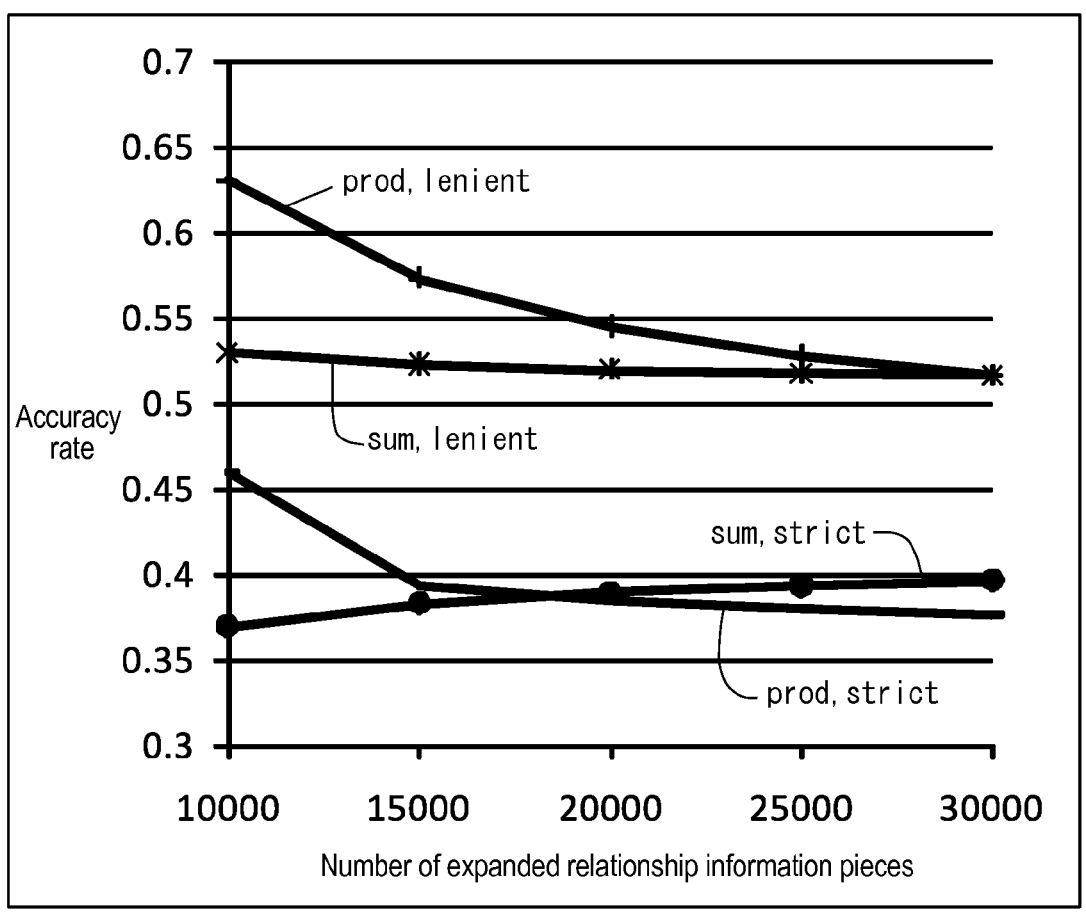
FIG. 8 is a diagram showing an experimental result according to Embodiment 1.

Next, the route score used in this experimental example will be described. In this experimental example, the two types of route scores, namely $S^{sum}$ and $S^{prod}$ mentioned above were used, and the results of ranking using those route scores were evaluated. The accuracy was evaluated for 200 relationships, that is, 100 relationships among those of the top 10,000 route scores and 100 relationships among those of the top 10,000 to 30,000 route scores, after excluding the relationships of the relationship information pieces. The result is shown in FIG. 8. The accuracy of the 15,000th and subsequent ranks in FIG. 8 was obtained by interpolation using the accuracy of the relationships of the top 10,000 route scores and the accuracy of the relationships of the top 10,000 to 30,000 route scores. With lenient agreement being correct, the accuracy for the top 10,000 prod ($S^{prod}$) route scores was 0.63, and the accuracy for the top 10,000 sum ($S^{sum}$) route scores was 0.53. While the accuracy is somewhat lowered compared with the accuracy of the relationship information pieces (the lenient accuracy of 0.80), that accuracy was achieved without considering how the words are used in the context. Note that the top 10,000 route scores indicate that 10,000 expanded relationship information pieces (excluding the relationship information pieces) were obtained from 10,000 relationship information pieces. Accordingly, it can be understood that the number of relationships can be expanded twice with little accuracy reduction. Also, as shown in FIG. 8, it can be considered that comparing sum and prod, the scores of prod are better because the accuracy of the top scores of prod is higher.

Next, it was checked whether or not any relationships that are difficult to acquire with pattern-based methods were able to be acquired. Specifically, lenient agreement was regarded as correct with respect to the relationships of the top 10,000 scores, and a ratio of the number of relationships of the 1 millionth and subsequent ranks was examined by the method in the De Saeger at al. Literature using 100 samplings, and the number of correct relationships included in the relationships of the top 10,000 scores was estimated using that ratio. Here, compared with the method in De Saeger et al. Literature that uses 50 million documents, this experimental example uses the co-occurrence frequency in 100 million documents, and so the comparison therebetween cannot be considered to be fair. Strictly speaking, comparison should be made with the same document set, and therefore, the comparison with De Saeger et al. is only for reference. The result was as below.

The number of relationships of the 1 millionth and subsequent ranks obtained by the method of De Saeger et al.
sum: about 3100
prod: about 3300

From the above result, in this experiment, it was confirmed that the relationships that were difficult to acquire by conventional pattern-based methods were actually able to be acquired. For example, as the relationships that are not included in the relationship information pieces, <lack of mineral, hay fever> and <dietary habits, acne> were able to be acquired. Note that the former information was generated by replacing both words in the relationship information piece <lack of calcium, atopy> or the like, and the latter one was generated by replacing one of the words in the relationship information piece <life habit, acne> or the like. Thus, in the present experimental example, it can be considered that even in the case of replacing both words included in a relationship information piece, the accuracy is maintained by performing the selection using the scores.

As described above, the relationship information expansion apparatus 1 according to the present embodiment, which expands the relationship information piece using the similarity information piece, is capable of generating relationships that were not able to be acquired by the conventional pattern-based methods. Also, a new relationship is generated by replacing a language expression with a similar language expression, and therefore, the language expression can be replaced with another language expression that does not have a common radical, and expansion in a broader range than in the case of Non-Patent Literature 2 mentioned above is possible. Also, it is possible to eliminate inappropriate relationships by acquiring the scores for the expanded relationships and performing the selection using those scores. Accordingly, each selected expanded relationship information can appropriately have a semantic relationship.

Here, how to use the relationships indicated by thus generated expanded relationship information pieces will be simply described. For example, in the case where the expanded relationship information pieces <myocardial infarction, sudden death>, <cerebral infarction, sudden death>, and <stroke, sudden death> were able to be obtained by the relationship information expansion apparatus 1 according to the present embodiment, an it is possible, upon a user inputting "sudden death" to an information search system, to make a keyword recommendation organized by the semantic relationship, such as "The 'cause' of 'sudden death' may be 'myocardial infarction', 'cerebral infarction', 'stroke', or the like." Also, in the case where expanded relationship information pieces superordinate<medicine, antivirus drug> and effect<antivirus drug, influenza> exist, a question "Which medicine is effective for influenza?" can be answered as "antivirus drug" based on appropriate inference. Also, relationships indicated by expanded relationship information pieces can also be used for various other purposes. Note that at that time, only the expanded relationship information pieces may be used, or information obtained by merging the expanded relationship information pieces and the relationship information piece may be used.

Needless to say, the score acquisition method used in the relationship information expansion apparatus 1 according to the present embodiment is not limited to the above-described one. For example, the score acquired by the score acquisition unit 15 may be a value of an increasing function related to two arguments that are the co-occurrence score and the route score. Then, selection may be performed using the score that is the value of the increasing function. Those increasing functions may be, for example, C1×the co-occurrence score+C2× the route score. Here, C1 and C2 are positive coefficients.

Also, needless to say, the co-occurrence score acquisition method used in the relationship information expansion apparatus 1 according to the present embodiment is not limited to the above-described one. For example, the score acquisition unit 15 may acquire a co-occurrence score that takes a higher value in the case where two or more language expressions included in a candidate expanded relationship information piece co-occur with a co-occurring language expression corresponding to the candidate expanded relationship information piece than in the case where only the two or more language expressions included in the candidate expanded relationship information piece co-occur with one another. Here, a co-occurring language expression corresponding to a candidate expanded relationship information piece is a language expression with a high co-occurrence degree with respect to two or more language expressions included in each relationship information piece (this relationship information piece may, but does not necessarily have to, be a relationship information piece stored in the relationship information storage unit 11) having a semantic relationship of the same type as that of the relationship information piece used at the time of generation of the candidate expanded relationship information piece. Note that the language expression with a high co-occurrence degree may be, for example, a language expression having a co-occurrence frequency equal to or larger than a threshold value, or may be a predetermined number of language expressions in descending order of co-occurrence frequency, as in the abovementioned case of the high scores. It can be described using a specific example, as below. For example, it is assumed that the candidate expanded relationship information piece <myocardial infarction, sudden death> was generated using the relationship information piece <myocardial infarction, death>. Also, it is assumed that the semantic relationship type of the relationship information piece <myocardial infarction, death" was "cause". Also, it is assumed that "cause", "reason", "factor" . . . are included in the language expressions with a high co-occurrence degree with two or more language expressions (all language expressions) included in each of the two or more (a larger number is preferable) relationship information pieces whose semantic relationship type is "cause". Then, "cause", "reason", "factor" . . . are the co-occurring language expressions. Also, in the case where two language expressions included in the candidate expanded relationship information piece <myocardial infarction, sudden death> co-occur with any of the co-occurring language expressions "cause", "reason", "factor", . . . , the co-occurrence score becomes higher than in the case where the two language expressions included in the candidate expanded relationship information piece <myocardial infarction, sudden death> co-occur with none of the co-occurring language expressions "cause", "reason", "factor", . . . . In that case, (1) a method for acquiring the co-occurrence score using stored co-occurring language expressions and (2) a method for acquiring the co-occurrence score using machine learning are available. Each of those methods will be hereinafter described. Needless to say, the co-occurrence score may be acquired as mentioned above by a method other than (1) and (2).

Figure 9:
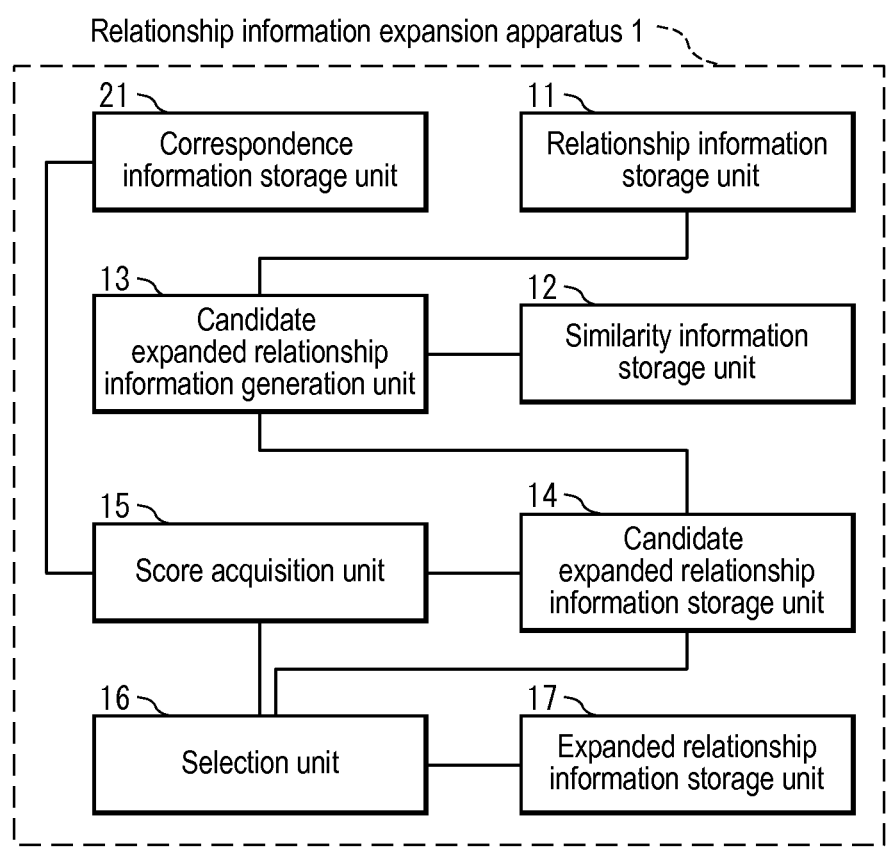
FIG. 9 is a block diagram showing another example of the configuration of the relationship information expansion apparatus according to Embodiment 1.

(1) Method for Acquiring the Co-Occurrence Score Using Stored Co-Occurring Language Expressions With this method, as shown in FIG. 9, the relationship information expansion apparatus further includes a correspondence information storage unit 21 in which one or more correspondence information pieces are stored. Here, the correspondence information piece is an information piece including a type identification information and one or more co-occurring language expressions corresponding to the type identification information that are associated with the semantic relationship type identified by the type identification information. Here, the type identification information is information for identifying the semantic relationship type of the relationship information piece. In the case of this method, each relationship information piece stored in the relationship information storage unit 11 also includes the type identification information that is information for identifying the semantic relationship type of two or more language expressions included in the relationship information piece. Here, each relationship information piece is represented in the form of "type identification information <the first language expression, the second language expression>". "Cause <myocardial infarction, death>" is one example. Also, the candidate expanded relationship information generation unit 13 generates a candidate expanded relationship information piece including the type identification information included in the relationship information piece used for generating the candidate expanded relationship information piece. Accordingly, the candidate expanded relationship information piece generated using the relationship information piece "cause <myocardial infarction, death>" is, for example, "cause <cerebral infarction, death>". The score acquisition unit 15 acquires the co-occurrence score that takes a higher value in the case where the two or more language expressions included in the candidate expanded relationship information piece co-occur with each co-occurring language expressions corresponding to the type identification information included in the candidate expanded relationship information piece, than in the case where only the two or more language expressions included in the candidate expanded relationship information pieces co-occur with one another. Here, "only the two or more language expressions included in the candidate expanded relationship information piece co-occur with one another" means that the two or more language expressions included in the candidate expanded relationship information piece co-occur with none of the co-occurring language expressions.

Note that the co-occurrence score needs only to resultantly take a higher value in the case where two or more language expressions included in the candidate expanded relationship information piece co-occur with each co-occurring language expressions corresponding to the type identification information included in the candidate expanded relationship information piece, than in the case where only the two or more language expressions included in the candidate expanded relationship information pieces co-occur with one another, and there is no limitation on the process thereof. For example, in the case where in the case where two or more language expressions included in the candidate expanded relationship information piece as well as any of the co-occurring language expressions corresponding to the type identification information included in the candidate expanded relationship information piece co-occur with one another, the score acquisition unit 15 may use, as the co-occurrence score, a value obtained by multiplying, by a number larger than 1 (e.g., 1.2, 1.5, 2, or the like), a co-occurrence scale acquired using the co-occurrence frequency or the like for the two or more language expressions included in the candidate expanded relationship information piece, as described above. Also, the co-occurrence score may take a higher value as the number of co-occurring language expressions that co-occur is larger. For example, it is assumed, regarding a certain candidate expanded relationship information piece, that the number of the co-occurring language expressions corresponding to the type identification information included in this candidate expanded relationship information piece is A. It is also assumed that among the A co-occurring language expressions, the number of the co-occurring language expressions that co-occur with the two or more language expressions included in the candidate expanded relationship information piece is B. It is also assumed that $R=B/A$. The score acquisition unit 15 may acquire the co-occurrence score that is a value of an increasing function with an argument that is R. Specifically, as mentioned above, a value obtained by multiplying, by $(1+C \times R)$, the co-occurrence scale obtained using the co-occurrence frequency or the like may be used as the co-occurrence score. Note that C is a positive coefficient. Further, the co-occurrence score may be higher score as the co-occurrence degree with a co-occurring language expression is higher. For example, the value of B mentioned above may be a sum of the co-occurrence frequencies between each of the two or more language expressions included in the candidate expanded relationship information piece and the co-occurring language expression.

Here is a description using a specific example. It is assumed that the correspondence information pieces shown in FIG. 10 are stored in the correspondence information storage unit 21. In each correspondence information piece in FIG. 10, type identification information is associated with co-occurring language expressions. For example, the type identification information "food material" is associated with the co-occurring language expressions "ingredient", "recipe", and so on. Accordingly, it is indicated that the language expressions having a high co-occurrence degree with all language expressions included in the relationship information pieces having the type identification information "food material" (e.g., the relationship information pieces such as food material <stew, potato>, which indicates that a food material of stew is potato, etc.) are "ingredient", "recipe", and the like. Also, it is assumed that the candidate expanded relationship information piece "food material <stew, sweet potato>" is stored in the candidate expanded relationship information storage unit 14. Then, as described above, the score acquisition unit 15 calculates the co-occurrence scale between two language expressions "stew" and "sweet potato". Also, the score acquisition unit 15 acquires, using the correspondence information in FIG. 10, the co-occurring language expressions "ingredient", "recipe", and so on, corresponding to the type identification information "food material" included in the candidate expanded relationship information piece "food material <stew, sweet potato>". Then, it is determined whether or not the three language expressions "stew", "sweet potato", and "co-occurring language expression" co-occur with one another, while changing the co-occurring language expression in turn. Here, for example, it is assumed that the total number of the co-occurring language expressions corresponding to the type identification information "food material" was 20, and among them, the number of the co-occurring language expressions that co-occur with "stew" and "sweet potato" was 5. Then, the score acquisition unit 15 may acquire the co-occurrence score=the co-occurrence scale$\times(1+C \times 5/20)$, as mentioned above. Meanwhile, for example, it is assumed that regarding the candidate expanded relationship information piece "food material <stew, starch>", there were no co-occurring expressions that co-occur with the two language expressions "stew" and "starch". Then, regarding this candidate expanded relationship information piece "food material <stew, starch>", the score acquisition unit 15 sets the co-occurrence scale between the two language expressions "stew" and "starch" as the co-occurrence score.

(2) Method for Acquiring the Co-Occurrence Score Using Machine Learning

With this method, the score acquisition unit 15 acquires the co-occurrence score using machine learning. That is, the score acquisition unit 15 uses, as a feature, at least a language expression that co-occurs with two or more language expressions included in a group of those two or more language expressions, performs machine learning with training data that are the value of the feature and existence or non-existence of a semantic relationship of the group of the two or more language expressions (note that this existence or non-existence of a semantic relationship is existence or non-existence of a semantic relationship among the two or more language expressions included in that language expression group, and acquires the co-occurrence score according to a probability degree, which is an output in the case where two or more language expressions included in a candidate expanded relationship information piece are input. This machine learning will be hereinafter described.

A problem (input) for the machine learning is a group of language expressions to be a target of co-occurrence score acquisition (this language expression group includes two or more language expressions. Also, the number of the language expressions included in this language expression group is the same as the number of language expressions included in a relationship information piece). Specifically, the problem is a candidate expanded relationship information piece. Also, a solution (output) for the machine learning is a probability degree indicating whether or not co-occurrence among the two or more language expressions included in the group (candidate expanded relationship information) of the two or more language expressions, which are the problem (input), is similar to that of the relationship information piece having the same semantic relationship type as the semantic relationship type corresponding to that candidate expanded relationship information piece. The semantic relationship type corresponding to the candidate expanded relationship information piece is the semantic relationship type of the relationship information piece used for generating that candidate expanded relationship information piece. Note that the solution (output) may include information about whether or not the two or more language expressions included in the candidate expanded relationship information piece of the problem (input) have a semantic relationship similar to that of the relationship information piece having the same semantic relationship type as the semantic relationship type corresponding to that candidate expanded relationship information piece. Also, the feature for the machine learning includes a list of language expressions that co-occur with the two or more language expressions (all language expressions) included in the group of the two or more language expressions that are the problem (input). That list may be a list of all language expressions that co-occur with the two or more language expressions included in the group of the two or more language expressions that are the problem (input), or may be a list of language expressions each having a high co-occurrence degree with the two or more language expressions included in the pair of the two or more language expressions that are the problem (input). To create this list, for example, the score acquisition unit 15 may determine whether or not the two or more language expressions included in the group of the two or more language expressions that are the problem (input) co-occur with every language expression. Here, every language expression used in this processing may be, for example, a language expression group stored in advance in a recording medium, which is not shown in the figure. Then, the language expressions determined to co-occur may be included in the list. Also, in the case of including only the language expressions having a high co-occurrence degree in the list, the score acquisition unit 15 may also calculate a co-occurrence scale (e.g., a co-occurrence frequency, a co-occurrence rate, or the like. Note that the co-occurrence scale used here is not a co-occurrence scale defined for only two language expressions, such as a Dice coefficient or a mutual information content, for example, but is preferably a co-occurrence scale defined also for three or more language expressions), and selects the language expressions each having a high co-occurrence degree according to that co-occurrence scale. Note that a language expression having a high co-occurrence degree may be, for example, a language expression having a co-occurrence frequency equal to or larger than a threshold value, or may be a predetermined number of language expressions in descending order of co-occurrence frequency, as in the abovementioned case of high scores. Also, the features for the machine learning may include any one or more of two or more language expressions included in the group of the two or more language expressions that are the problem (input), the co-occurrence scale among two or more language expressions included in the group of the two or more language expressions that are the problem (input), attributes (e.g., word classes of the language expressions, broader words of the language expressions, or the like) of two or more language expressions included in the group of the two or more language expressions that are the problem (input), the semantic relationship type corresponding to the candidate expanded relationship information piece serving as the group of the two or more language expressions that are the problem (input), and the co-occurrence scale (e.g., a co-occurrence frequency, a co-occurrence rate, or the like, and preferably a co-occurrence scale defined also for three or more language expressions, as mentioned above) among the two or more language expressions included in the group of the two or more language expressions that are the problem (input) with each language expression included in the list of language expressions that co-occur with the two or more language expressions included in the group of the two or more language expressions that are the problem (input). Note that in the case of using the semantic relationship type as the feature, for example, the type identification information may be included in the group of the two or more language expressions that are the problem (input), and this type identification information may be used as the feature. Also, the co-occurrence score may be acquired by performing learning by semantic relationship type and using the leaning result by semantic relationship type, without using the semantic relationship type as the feature. For example, when the co-occurrence score is acquired for the candidate expanded relationship information piece corresponding to the type identification information "cause", the co-occurrence score may be acquired by using the leaning result obtained by learning in association with the type identification information "cause".

Also, the training data used in this machine learning is existence or non-existence of a semantic relationship of the group of two or more language expressions, and the values of the abovementioned features corresponding to the group of the two or more language expressions. For example, as a group of two or more language expressions corresponding to the type identification information "cause" in a positive example of the training data (i.e., having a semantic relationship), the relationship information pieces of the semantic relationship type identified by the type identification information "cause" may be used. These relationship information pieces may, but does not necessarily have to, be those stored in the relationship information storage unit 11. Also, as a group of two or more language expressions corresponding to the type identification information "cause" in a negative example (i.e., having no semantic relationship) of the training data, a group of two or more language expressions randomly acquired from an arbitrary corpus may be used.

Upon the candidate expanded relationship information piece to be a determination target being input after the learning using the training data, the feature values related to this candidate expanded relationship information piece are acquired, and a probability degree related to a semantic relationship between the two or more language expressions included in the candidate expanded relationship information piece is output. For example, the probability degree may be a value ranging from −1 to 1. Also, as described above, the result of whether or not a semantic relationship exists may also be output. For example, if the probability degree is between −1 to 0 inclusive, the result indicates that no semantic relationship exists, and if the probability degree is larger than 0 and 1 or smaller, the result indicates that a semantic relationship exists. The score acquisition unit 15 acquires a co-occurrence score according to the probability degree. Specifically, in the case where the probability degree is a value between −1 and 1 inclusive, the co-occurrence score may be a value of an increasing function with an argument that is the probability degree. Specifically, the co-occurrence score may be C×(the probability degree+1). Note that C is an arbitrary coefficient. Also, 1 is added to the probability degree so that the co-occurrence score is a positive value. Note that in both cases where the two or more language expressions included in the candidate expanded relationship information piece have a semantic relationship, and where they do not have a semantic relationship, if the probability degree takes a value in the range from 0 to 1, the co-occurrence score may be C×(1+probability degree) in the case of having a semantic relationship, and the co-occurrence score may be C×(1−probability degree) in the case of not having a semantic relationship. Also, as the co-occurrence score, only the probability degree in the case where the result indicates that the two or more language expressions included in the candidate expanded relationship information piece have a semantic relationship may be used. In this case, for example, the co-occurrence score may be C×probability degree. Thus, as a result of acquiring the co-occurrence score using machine learning, it is possible to acquire the co-occurrence score that takes a higher value in the case where two or more language expressions included in the candidate expanded relationship information piece co-occur with the co-occurring language expression corresponding to that candidate expanded relationship information piece, than in the case where only the two or more language expressions included in the candidate expanded relationship information piece co-occur with one another.

Also, the present embodiment has been described for the case of generating the candidate expanded relationship information pieces using all similarity information pieces stored in the similarity information storage unit 12, but the present invention is not limited thereto. That is, the candidate expanded relationship information generation unit 13 may generate the candidate expanded relationship information pieces using a part of the similarity information pieces stored in the similarity information storage unit 12. Therefore, for example, each relationship information piece stored in the relationship information storage unit 11 may also include the type identification information that is the information for identifying the semantic relationship type of two or more language expressions included in the relationship information piece. Also, in the similarity information storage unit 12, the type identification information and the similarity information corresponding to the type identification information may be stored. The candidate expanded relationship information generation unit 13, when replacing at least one of the language expressions included in each relationship information piece stored in the relationship information storage unit 11, may perform replacement using the similarity information corresponding to the type identification information included in the relationship information piece.

Specifically, it is assumed that the similarity information pieces shown in FIG. 11 is stored in the similarity information storage unit 12. In FIG. 11, the similarity information pieces and the type identification information are associated with each other. Note that different from the similarity information piece of FIG. 5, the similarity information piece in FIG. 11 is information in which only two language expressions that are similar to each other are associated with the type identification information. Further, it is assumed that the relationship information piece "local specialty <Ehime, mandarin orange>" is stored in the relationship information storage unit 11. This relationship information indicates that the local specialty of Ehime is mandarin orange. In the case of generating the candidate expanded relationship information pieces using this relationship information piece, the candidate expanded relationship information generation unit 13 acquires the type identification information "local specialty" from the relationship information piece, and specifies the similarity information associated with the type identification information "local specialty". Then, the candidate expanded relationship information generation unit 13 generates, using the specified similarity information piece, the candidate expanded relationship information pieces in which at least one of the language expressions "Ehime" and "mandarin orange" included in the relationship information piece "local specialty <Ehime, mandarin orange>" is replaced. Specifically, the candidate expanded relationship information pieces "local specialty <Kagawa, mandarin orange>" and the like are generated, in which Ehime is replaced with Kagawa, and are accumulated in the candidate expanded relationship information storage unit 14. Note that each candidate expanded relationship information piece may include, but does not necessarily have to, include the type identification information. Note that correspondence between the type identification information shown and the similarity information pieces in FIG. 11 may be generated manually, or may be generated by another method. Also, "Ehime", "Kagawa", "Tokushima", and "Kochi" are the names of prefectures in Japan.

Note that the case of generating the candidate expanded relationship information pieces using the similarity information pieces corresponding to the type identification information has been described here, but the candidate expanded relationship information pieces may be generated using the type identification information and also the similarity information piece corresponding to the language expression that is not the replacement target. Also in that case, each relationship information piece includes the type identification information. Also, the type identification information, the language expression that is not the replacement target, and the similarity information piece corresponding thereto are stored in the similarity information storage unit 12. The candidate expanded relationship information generation unit 13, when replacing one language expression included in the relationship information piece stored in the relationship information storage unit 11, performs replacement using the type identification information included in the relationship information piece and the similarity information piece corresponding to the language expression included in the relationship information piece that is not the replacement target. Here, in the case where N (N is an integer equal to or larger than 2) language expressions are included in the relationship information piece, the number of the language expressions that are not the replacement target is (N−1). Accordingly, in that case, the similarity information piece is associated with the type identification information and (N−1) language expressions that are not the replacement target in the similarity information storage unit 12. For example, it is assumed that in the case of N=2, the information shown in FIG. 12 is stored in the similarity information storage unit 12. In FIG. 12, type identification information, a single language expression that is not the replacement target, and a similarity information piece are associated with one another. Also, each similarity information piece of FIG. 12 is a similarity information piece in which two language expressions are associated with each other, similarly to the case in FIG. 11. Here, for example, processing performed by the candidate expanded relationship information generation unit 13 for generating the candidate expanded relationship information pieces using the relationship information piece "cause <myocardial infarction, death>" will be described. In the case of replacing, with this processing, the first language expression "myocardial infarction" in the relationship information piece, the candidate expanded relationship information generation unit 13 acquires the type identification information "cause" of this relationship information piece and the language expression "death" that is not the replacement target. After that, the candidate expanded relationship information generation unit 13 refers to the information in FIG. 12, and specifies the similarity information piece corresponding thereto. Then, the candidate expanded relationship information generation unit 13 generates, using the specified similarity information piece, the candidate expanded relationship information pieces "cause <cerebral infarction, death>", "cause <stroke, death>", and the like in which the first language expression "myocardial infarction" is replaced with "cerebral infarction" and the like, and accumulated the candidate expanded relationship information pieces in the candidate expanded relationship information storage unit 14. Note that correspondence between the type identification information and the similarity information pieces shown in FIG. 12 may be generated manually, or may be generated by another method. In the latter case, for example, the similarity information pieces may be generated only from documents containing the language expression that is not the replacement target. Alternatively, for example, in the case where the co-occurrence degree between a language expression that is not the replacement target and all language expressions included in the similarity information piece is high in each record in FIG. 11, a record in which the language expression that is not the replacement target is added to the record in FIG. 11 may be created, thereby obtaining the record in FIG. 12. For example, if, in the first record in FIG. 11, the language expression "mandarin orange" that is not the replacement target has a high co-occurrence degree with both language expressions "Ehime" and "Kagawa" included in the similarity information piece, a record may be generated by adding the language expression "mandarin orange" that is not the replacement target to the first record in FIG. 11, and the generated record may be added to the information in FIG. 12. Note that the information in FIG. 12 may be temporarily generated at the time of generation of each candidate expanded relationship information piece and stored in the similarity information storage unit 12. For example, in the case where the type identification information is "cause", if the language expression that is not the replacement target is "death", the similarity information piece corresponding thereto may be generated and accumulated in the similarity information storage unit 12, and then, if the next language expression that is not the replacement target is "sudden death", the similarity information piece corresponding to the type identification information "cause" and the language expression "sudden death" that is not the replacement target may be generated and accumulated in the similarity information storage unit 12. Generation of the similarity information piece and the like may be performed by, for example, the candidate expanded relationship information generation unit 13, or by another component.

Also, the relationship information expansion apparatus 1 according to the present embodiment may be provided with an output unit for outputting the expanded relationship information pieces stored in the expanded relationship information storage unit 17, or the candidate expanded relationship information pieces that are indicated as the expanded relationship information pieces by the flags or the like in the candidate expanded relationship information storage unit 14. The output by this output unit may be, for example, display on a display device (e.g., a CRT, a liquid-crystal display, etc.), transmission via a communication line to a predetermined device, printing by a printer, or accumulation in a recording medium. Note that the output unit may include, but does not necessarily have to, include a device for performing output (e.g., a display device, a printer, etc.). Also, the output unit may be implemented by hardware, or may be implemented by software such as a driver for driving such a device.

Also, there is no limitation on the language of language expressions included in the relationship information piece, the candidate expanded relationship information piece, and the like on which the relationship information expansion apparatus 1 according to the present embodiment performs processing. The language expressions may be described in, for example, Japanese, English, Germany, French, Russian, Chinese, Spanish, or the like. Here, the language of the relationship information piece and the like stored in the relationship information storage unit 11, the similarity information storage unit 12, the candidate expanded relationship information storage unit 14, and the expanded relationship information storage unit 17 are all the same.

Description of Machine Learning

Here, the machine learning used in the above-described embodiment will be described. The machine learning method is a method of preparing a large number of sets of problem-solution combinations, learning solutions derived from each problem by performing the learning using those sets, and enabling estimation of a solution to a new problem using the learning results. For example, refer to the following literature.

Literature: Masaki Murata, "Language Processing Based on Machine Learning", Ryukoku University Faculty of Science and Technology. Invited Lecture, 2004 (http://www2.nict.go.jp/jt/a132/members/murata/ps/rk1-siryou.pdf)

Literature: Masaki Murata, Qing Ma, Kiyotaka Uchimoto, Hitoshi Isahara, "Japanese-English Translation of Tense Aspect Modality Using Support Vector Machine", The Institute of Electronics, Information and Communication Engineers Natural Language Understanding and Models of Communication NLC2000-78, 2001

Literature: Masaki Murata, Masao Uchiyama, Kiyotaka Uchimoto, Qing Ma, Hitoshi Isahara, "Attempt of CRL in NSEVAL2J Dictionary Task", The Institute of Electronics, Information and Communication Engineers Natural Language Understanding and Models of Communication NLC2001-40, 2001

To cause a machine learning algorithm to work, features (elements constituting a problem that are information used in analysis) are necessary when conveying the status of the problem to the machine. A problem is expressed by the features. For example, in the case where, with respect to a problem of tense estimation in a sentence-end expression in Japanese, a problem: "Kare-ga-hanasu. (a Japanese sentence which means 'He talks.')" - - - a solution: "present" are given, the exemplary features are "Kare-ga-hanasu.", "ga-hanasu.", "hanasu.", "su", and ".".

That is, the machine learning method is a method of preparing a large number of sets of feature set-solution combinations, learning solution derived from each feature set by performing learning using those sets, and extracting, with respect to a new problem, a feature set from the problem using the learning result to estimate a solution corresponding to the features. Note that the "solution" here is, for example, whether or not the problem is the above-mentioned answering information, class information, or the like.

As the machine learning method, for example, the method such as a k-nearest neighbor method, a simple Bayesian method, a decision list method, a maximum entropy method, a support vector machine method, or the like may be used. Note that the following description is made mainly about the machine learning in the case of classifying documents (in the case where the problem-solution sets are sentence-class sets), but needless to say, the present invention can be also applied to other machine learning.

The k-nearest neighbor method is a method of using k most similar instances instead of a single most similar instance, and obtaining a solution (class) based on decision by majority in these k cases. k is a number that is a predetermined integer, and generally, an odd number within a range from 1 to 9 is used.

The simple Bayesian method is a method of estimating a probability of each solution (class) based on a Bayes' theorem, and determining a solution with the largest probability value to be the solution to be obtained.

In the simple Bayesian method, the probability that a class a is output in a context b is given by the following expression:

[Expression 6]

$$p(a|b) = \frac{p(a)}{p(b)} p(b|a)$$

$$\cong \frac{\tilde{p}(a)}{\tilde{p}(b)} \prod_i \tilde{p}(f_i|a)$$

Here, the context b is a set of preset features $f_j (\in F, 1 \leq j \leq k)$. p(b) is the probability of appearance of the context b. Here, p(b) is not calculated because it is not dependent on the class a and is a fixed number. P(a) (here, P is p with a tilde above) and $P(f_i|a)$ are probabilities estimated from training data, and mean the probability of appearance of the class a and the probability of having the feature $f_i$ with the class a, respectively. If a value obtained by performing maximum likelihood estimation with $P(f_i|a)$ is used, the value often becomes zero, and in some cases it is difficult to decide a class because the value of the above expression in the second line is zero. Therefore, smoothing is performed. Here, the value obtained by performing smoothing with the following expression is used.

[Expression 7]

$$p(f_i|a) = \frac{\text{freq}(f_i, a) + 0.01 * \text{freq}(a)}{\text{freq}(a) + 0.01 * \text{freq}(a)}$$

Here, freq($f_i$, a) means the number of instances that have the feature $f_i$ and fall under the class a, and freq(a) means the number of instances that fall under the class a.

Needless to say, the smoothing method is not limited to the one using the above expression, and another method may alternatively be used.

The decision list method is a method of using combinations of feature and class as rules and storing those rules in a list in predetermined order of priority. When an input to be a detection target is given, the input data is compared with the features in the rules in descending order of priority in the list, and the class in the rule of the matched feature is determined as the class of the input.

With the decision list method, only one of the preset features $f_j (\in F, 1 \leq j \leq k)$ is set to the context, and the probability value of each class is obtained. The probability that the class a is output in a certain context b is given by the following expression:

$$p(a|b) = p(a|f_{max}) \qquad \text{[Expression 8]}$$

Here, $f_{max}$ is given by the following expression:

$$f_{max} = \arg\max_{f_j \in F} \max_{a_i \in A} \tilde{p}(a_i|f_j) \qquad \text{[Expression 9]}$$

Also, $P(a_i|f_j)$ (here, P is p with a tilde above) is a ratio of appearance of the class $a_i$ in the case where the feature $f_j$ is the context.

The maximum entropy method is a method with which, assuming that a set of preset features $f_j (1 \leq j \leq k)$ is F, a probability distribution p(a, b) at the time when an expression indicating entropy is maximum while satisfying the following predetermined conditional expression is obtained, and the class having the largest probability value among the probabilities of the classes obtained according to this probability distribution is determined to be the class.

The predetermined conditional expression is given as the following expression:

[Expression 10]

$$\sum_{a \in A, b \in B} p(a,b) g_j(a,b) = \sum_{a \in A, b \in B} \tilde{p}(a,b) g_j(a,b) \text{ for}$$

$$\forall f_j (1 \leq j \leq k)$$

Also, the expression indicating entropy is given as the following expression:

[Expression 11]

$$H(p) = -\sum_{a \in A, b \in B} p(a,b) \log(p(a,b))$$

Here, A and B mean the set of classes and contexts, respectively. Also, $g_j(a, b)$ indicates a function whose value is 1 in the case where the context b has the feature $f_j$ and the class is a, and whose value is 0 in other cases. Also, $\tilde{P}(a_i|f_j)$ (here, P is p with a tilde above) means a ratio of appearance of (a, b) in known data.

With the above conditional expression, an expected value for frequency of the combination of an output and a feature is obtained by multiplying a probability p by a function g that means appearance of the combination of the output and the feature. Entropy maximization (smoothing of a probability distribution) is performed with a restriction that the expected value in the known data on the right side is equal to the expectation value calculated based on the probability distribution obtained by the left side, and the probability distribution of the output and the context is obtained. As for the detail of the maximum entropy method, refer to the following literatures.

Literature: Eric Sven Ristad, "Maximum Entropy Modeling for Natural Language", ACL/EACL Tutorial Program, Madrid, 1997

Literature: Eric Sven Ristad, "Maximum Entropy Modeling Toolkit, Release 1.6 beta", (http://www.mnemonic.com/software/memt), 1998

The support vector machine method is a technique of classifying data constituted of two classes by dividing space by a hyperplane.

Figure 13:
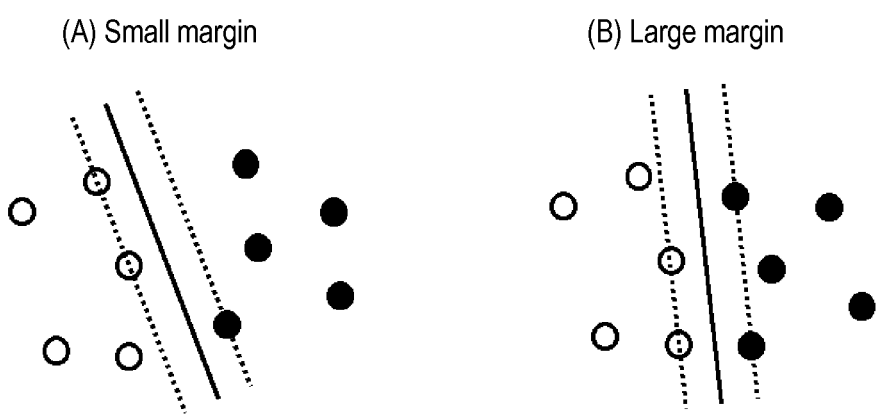
FIG. 13 is a diagram for depicting a support vector machine according to Embodiment 1.

FIG. 13 show concepts of the margin maximization in the support vector machine method. In FIG. 13, a white dot indicates a positive example, a black dot indicates a negative example, a solid line indicates a hyperplane that divides the space, and a broken line indicates a surface representing a boundary of a margin area. FIG. 13(A) is a conceptual diagram of the case where an interval between positive examples and negative examples is narrow (small margin), and FIG. 13(B) is a conceptual diagram of the case where the interval between positive examples and negative examples is wide (large margin).

At this time, assuming that the two classes are constituted respectively of positive examples and negative examples, the possibility of incorrect classification with open data is lower as the interval (margin) between positive examples and negative examples in the training data is larger, and as shown in FIG. 13(B), a hyperplane that maximizes this margin is obtained to perform classification.

The support vector machine method is basically as described above, while generally the one employing the expansion of the method that allows inclusion of a few instances in an internal area of the margin in the training data, or the expansion for rendering a linear area in a hyperplane non-linear (introduction of a Kernel function) is used.

The expanded method is equivalent to performing classification using the following discriminant function (f(x)), and two classes can be discriminated based on whether an output value of the discriminant function is positive or negative.

[Expression 12]

$$f(x) = \text{sgn}\left(\sum_{i=1}^{l} \alpha_i y_i K(x_i, x) + b\right) \quad (M1)$$

$$b = -\frac{\max_{i,y_i=-1} b_i + \min_{i,y_i=1} b_i}{2}$$

$$b_i = \sum_{j=1}^{l} \alpha_j y_j K(x_j, x_i)$$

Here, x means a context (feature set) of an instance that is desired to be discriminated, $x_i$ and $y_j$ (i=1, ..., 1, $y_j \in \{1,-1\}$) respectively mean a context and a class of the training data, and the function sgn is:

$$\text{sgn}(x) = 1 (x \leq 0)$$

$$-1 \text{ (otherwise)}$$

and each $\alpha_i$ is for the case of maximizing the formula (M2) with the restriction of the formula (M3) and the formula (M4).

[Expression 13]

$$L(\alpha) = \sum_{i=1}^{l} \alpha_i - \frac{1}{2}\sum_{i,j=1}^{l} \alpha_i \alpha_j y_i y_j K(x_i, x_j) \quad (M2)$$

$$0 \leq \alpha_i \leq C \ (i = 1, \ldots, l) \quad (M3)$$

$$\sum_{i=1}^{l} \alpha_i y_i = 0 \quad (M4)$$

Also, the function K is called a Kernel function, and various kinds thereof are used, while in the present embodiment, the following polynomial function is used.

$$K(x,y)=(x \cdot y+1)d$$

Here, C and d are experimentally set fixed values. For example, C was fixed to 1 through the entire processing. Also, for d, two values, namely 1 and 2 were experimented. Here, $x_i$ with which $\alpha_i > 0$ is called support vector, and usually, the portion that takes a sum in the formula (M1) is calculated using only the instance thereof. That is, in the actual analysis, only the instance called support vector in the training data is used.

As for the detail of the expanded support vector machine method, refer to the following literature.

Literature: Nello Cristianini, John Shawe-Taylor, "An Introduction to Support Vector Machines and Other Kernel-Based Learning Methods", Cambridge University Press, 2000

Literature: Taku Kudoh, "Tinysvm: Support Vector Machines", (http://cLaistnara.ac.jp/taku-kullsoftware/TinySVM/index.html), 2000

The support vector machine method usually handles data in which the number of classes is two. Accordingly, in the case of handling the case of handling an instance with three or more classes, usually a method such as a pairwise method or a one-vs-rest method is used in combination therewith.

The pairwise method is a method with which, in the case of data having n classes, all pairs (n(n−1)/2 pairs) for two different classes are generated, a better class for each pair is determined by a binary classifier, that is, a support vector machine method processing module, and eventually, the class is obtained based on decision by majority of the classes by the binary class on the n(n−1)/2 pairs.

With the one-vs-rest method, if, for example, there are three classes that are a, b, and c, three combinations, namely the class a and the rest, the class b and the rest, and the class c and the rest are generated, and learning processing is performed by the support vector machine method on each combination. Then, in estimation processing based on the learning result, the learning results of the support vector machines for those three combinations are used. How the problem to be estimated is estimated by those three support vector machines is observed, and among the three support vector machines, the class that is not the rest and in the case where the class and the rest are most separated from a separation plane of the support vector machine is determined to be an obtained solution. For example, regarding a certain problem to be solved, in the case where the class and the rest are most separated from the separation plane in the support vector machine created by the learning processing on the combination of "the class a and the rest", the class for the problem to be solved is estimated to be a.

The method of obtaining a degree of tendency of solution (classes) for a problem to be solved estimated by a solution estimating means, which is not shown in the figure, is different depending on various methods used as the machine learning method by a machine learning means, which is not shown in the figure.

For example, in the case where the machine learning means uses the k-nearest neighbor method as the machine learning method, the machine learning means defines, with respect to instances in training data, a similarity degree among the instances based on a ratio of overlapping features in a set of features extracted from those instances (a ratio indicating the number of the same features included), and stores the above-defined similarity degree and the instances as learning result information in a learning result storing means.

When the features of the problem to be solved (document group attribution information) are extracted, the solution estimating means refers to the defined similarity degree and the instances in the learning result storing means, selects, with respect to the extracted features of the problem to be solved, k instances from the instances in the learning result storing means in descending order of the similarity degree among the features of the problem to be solved, and estimates the class determined based on decision by majority on the selected k instances to be the class (solution) for the problem to be solved. That is, in the solution estimating means, the degree of tendency of the solution (class) for the problem to be solved is the number of votes in the decision by majority on the selected k cases.

Also, in the case of using the simple Bayesian method as the machine learning method, the machine learning means, which is not shown in the figure, stores the combinations of the solution and the feature set in the instances in the training data as the learning result information in the learning result storing means. When the features of the problem to be solved are extracted, the solution estimating means calculates a probability that the solution is each class in the case of the feature set of the problem to be solved based on Bayes' theorem using the combinations of the solution and the feature set in the learning result information in the learning result storing means, and estimates the class with the largest probability value to be the class (solution) of the features of the problem to be solved. That is, in the solution estimating means, the degree of tendency of the solution in the case of the feature set of the problem to be solved is the probability that each class is the solution.

Also, in the case of using the decision list method as the machine learning method, the machine learning means, which is not shown in the figure, causes some kinds of means to store in advance a list of rules of features and classes arranged in a predetermined order of priority with respect to each instance in the training data in the learning result storing means. When the features of the problem to be solved are extracted, the solution estimating means compares the extracted features of the problem to be solved with the features in the rules in the list in descending order of priority in the learning result storing means, and estimates the class in the rule whose feature matches to be the class (solution) of the problem to be solved.

Also, in the case of using the maximum entropy method as the machine learning method, the machine learning means, which is not shown in the figure, specifies the classes that can be the solution from the instances in the training data, obtains probability distributions each constituted of two terms that are the feature set at the time when it satisfies a predetermined conditional expression and maximizes the expression indicating entropy and the class that can be the solution, and stores the obtained probability distribution in the learning result storing means. When the features of the problem to be solved are extracted, the solution estimating means obtains, using the probability distribution in the learning result storing means, a probability of each class that can be the solution with respect to the extracted feature set of the problem to be solved, specifies the class that can be the solution and has the largest probability value, and estimates the specified class to be the solution to the problem to be solved. That is, in the solution estimating means, the degree of tendency of the solution in the case of the feature set of the problem to be solved is the probability that each class is the solution.

Also, in the case of using the support vector machine method as the machine learning method, the machine learning means, which is not shown in the figure, specifies classes that can be the solution from the instances in the training data, divides the classes into positive examples and negative examples, obtains a hyperplane that maximizes the interval between the positive examples and the negative examples of the instance, and also separates the positive examples and the negative examples in the space having dimensions that are the feature set of the instances in accordance with a predetermined executive function using a Kernel function, and stores the obtained hyperplane in the learning result storing means. When the features of the problem to be solved are extracted, the solution estimating means specifies, using the hyperplane in the learning result storing means, whether the feature set of the problem to be solved is on the positive example side or on the negative example side in the space divided by the hyperplane, and estimates the class determined based on the specified result to be the solution to the problem to be solved. That is, in the solution estimating means, the degree of tendency of the solution in the case of the feature set of the problem to be solved is the length of the distance from a separation plain to the instance of the problem to be solved.

Also, in the above-described embodiment, in the case where a certain component performs processing using the machine learning, there is no limitation on the timing of the learning, as long as the learning is performed until desired processing is performed.

Also, although the above-described embodiment have been described for the case where the relationship information expansion apparatus 1 is stand-alone, the relationship information expansion apparatus 1 may be a stand-alone apparatus, or may be a server device in a server-client system. In the latter case, the expanded relationship information piece and the like may be output via a communication line.

Also, in the above-described embodiment, each process or each function may be implemented by a single device or a single system performing centralized processing, or may be implemented by a plurality of devices or a plurality of systems performing distributed processing.

Also, in the above-described embodiment, information related to processing performed by each component, such as information accepted, acquired, selected, generated, transmitted, or received by the component, or information on thresholds, expressions, addresses, or the like used by the component for the processing may be stored temporarily or for a long time in a recording medium, which is not shown in the figure, even if it is not clearly stated in the above description. Also, accumulation of information in the recording medium not shown in the figure may be performed by each component, or an accumulation unit, which is not shown in the figure. Also, reading of information from the recording medium not shown in the figure may be performed by each component, or a reading unit, which is not shown in the figure.

Also, in the above-described embodiment, in the case where change information used by each component, such as information on thresholds, addresses, various set values or the like used by each component for processing may be changed by a user, the user may, but does not necessarily have to, be allowed to change such information as appropriate, even if it is not clearly stated in the above description. In the case where such information can be changed by a user, this change may be implemented by, for example, an accepting unit, which is not shown in the figure, for accepting a change instruction from the user, and a changing unit, which is not shown in the figure, for changing the information according to the change instruction that is not shown in the figure. Acceptance of the change instruction by the accepting unit not shown in the figure may be, for example, acceptance from an input device, receipt of information transmitted via a communication line, or acceptance of information read out from a predetermined recording medium.

Also, in the above-described embodiment, in the case where two or more components included in the relationship information expansion apparatus 1 have a communication device, an input device, or the like, the two or more components may have a physically single device, or have separate devices.

Also, in the above-described embodiments, each component may be constituted of dedicated hardware, or each component that can be implemented by software may be implemented by executing a program. For example, each component can be implemented by a program executing unit such as a CPU reading out and executing a software program recorded on a recording medium such as a hard disk or a semiconductor memory. Note that the software that implements the relationship information expansion apparatus 1 in the above-described embodiment is a program such as one described below. That is, this program is a program for causing a computer to execute: a candidate expanded relationship information generation step of generating, using similarity information pieces stored in a similarity information storage unit in which two or more similarity information pieces each including two or more similar language expressions are stored, a candidate expanded relationship information piece in which at least one language expression was replaced with a language expression similar to the at least one language expression, the at least one language expression being included in a relationship information piece stored in a relationship information storage unit in which a relationship information piece including two or more language expressions having a semantic relationship is stored, and accumulating the candidate expanded relationship information piece in a candidate expanded relationship information storage unit in which the candidate expanded relationship information piece is stored, a score acquisition step of acquiring a score that indicates a probability that the candidate expanded relationship information piece stored in the candidate expanded relationship information storage unit has a semantic relationship; and a selection step of selecting, using the score acquired in the score acquisition step, an expanded relationship information piece, which is a candidate expanded relationship information piece having a high score among candidate expanded relationship information pieces stored in the candidate expanded relationship information storage unit.

Note that in the above-described program, in the transmission step of transmitting information, the reception step of receiving information, and the like, at least processing performed only by hardware, such as processing performed by a modem or an interface card in the transmission step, for example, is not included.

Also, this program may be downloaded from a server or the like and executed, or executed as a result of a program recorded on a predetermined recording medium (e.g., an optical disk such as a CD-ROM, a magnetic disk, a semiconductor memory, etc.) being read out. Also, this program may be used as a program that constitutes a program product.

Also, this program may be executed by a single computer, or may be a plurality of computers. That is, centralized processing may be performed, or distributed processing may be performed.

Figure 14:
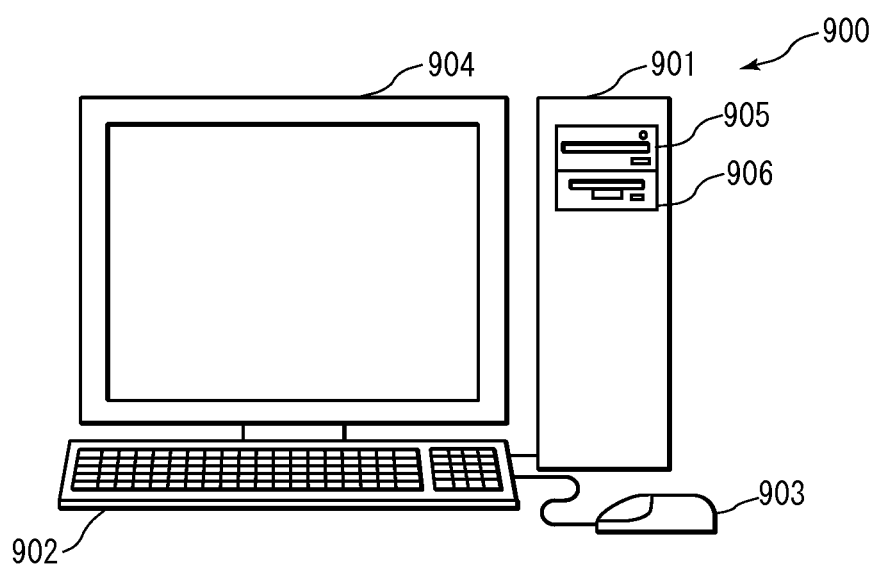
FIG. 14 is a schematic diagram showing an example of appearance of a computer system according to Embodiment 1.

FIG. 14 is a schematic diagram showing an example of an appearance of a computer that implements the relationship information expansion apparatus 1 according to the above-described embodiment by performing the above-described program. The above-described embodiment can be implemented by computer hardware and a computer program executed thereon.

In FIG. 14, a computer system 900 is provided with a computer 901 including a CD-ROM (Compact Disk Read Only Memory) drive 905 and an FD (Floppy (registered trademark) Disk) drive 906, a keyboard 902, a mouse 903, and a monitor 904.

Figure 15:
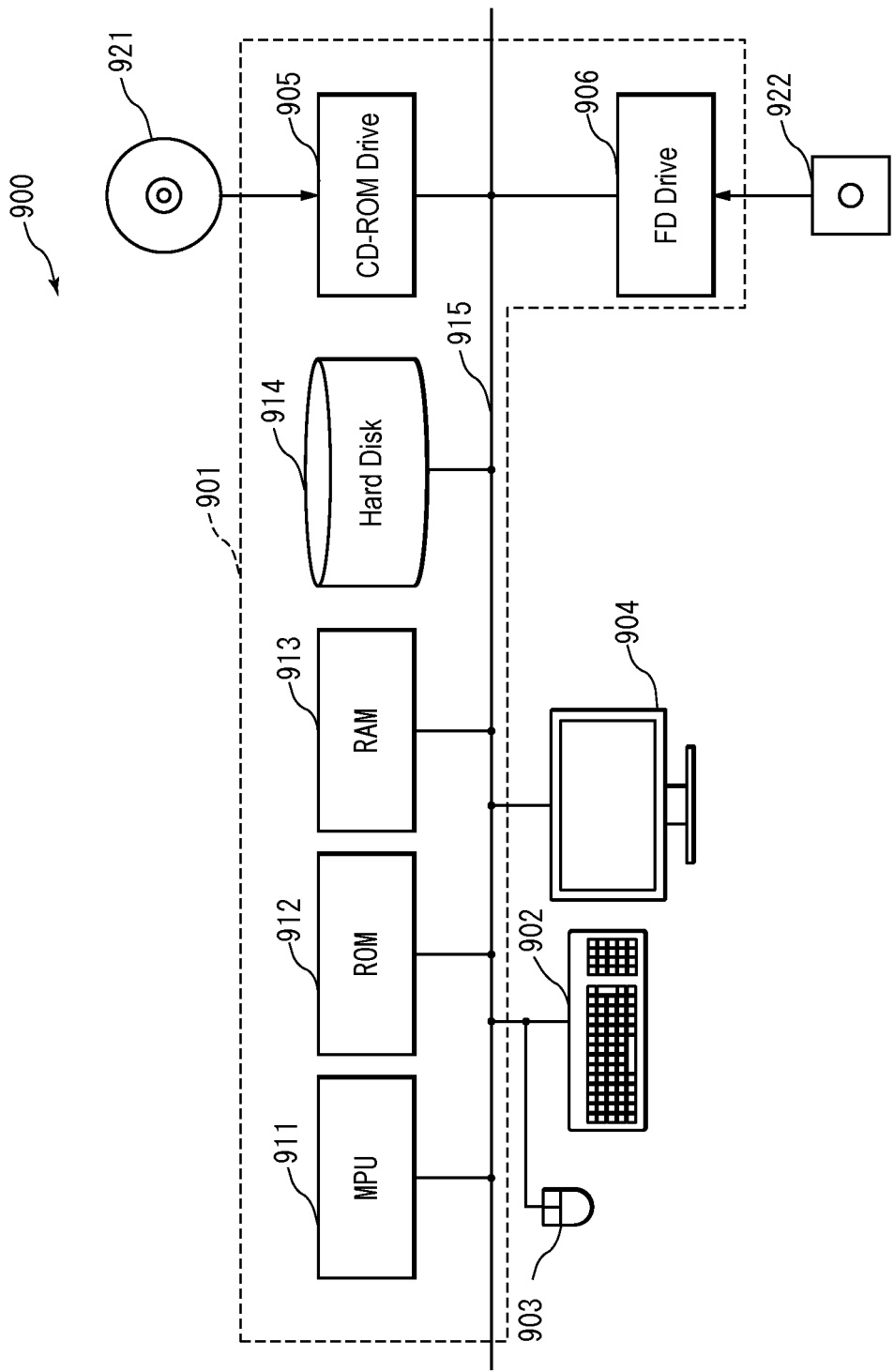
FIG. 15 is a diagram showing an example of a configuration of a computer system according to Embodiment 1.

FIG. 15 is a diagram showing an internal configuration of the computer system 900. In FIG. 15, the computer 901 is provided with the CD-ROM drive 905 and the FD drive 906, as well as an MPU (Micro Processing Unit) 911, a ROM 912 for storing programs such as a boot-up program, a RAM (Random Access Memory) 913 connected to the MPU 911 for temporarily storing commands in application programs and providing a temporal storage space, a hard disk 914 for storing application programs, system programs, and data, and a bus 915 that mutually connects the MPU 911, the ROM 912, and the like. Note that the computer 901 may include a network card, which is not shown in the figure, for providing connection to a LAN.

The program that causes the computer system 900 to perform the functions of the relationship information expansion apparatus 1 according to the above-described embodiment may be stored in the CD-ROM 921 or the FD 922, which is inserted into the CD-ROM drive 905 or the FD drive 906, respectively, and the program may be transferred to the hard disk 914. Alternatively, the program may be transmitted to the computer 901 via a network, which is not shown in the figure, and stored in the hard disk 914. The program is loaded onto the RAM 913 when executed. Note that the program may be loaded directly from the CD-ROM 921, the FD 922, or the network.

The program does not necessarily have to include an operating system (OS), a third-party program, or the like for causing the computer 901 to perform the functions of the relationship information expansion apparatus 1 according to the above-described embodiments. The program may include only a commanding portion for calling appropriate functions (modules) in a controlled manner so as to obtain a desired result. How the computer system 900 works is well-known, and the detailed description thereof is omitted.

Needless to say, the present invention is not limited to the above-described embodiment and can be altered in various manners, and those alterations are also embraced in the scope of the present invention.

INDUSTRIAL APPLICABILITY

As described above, according to the relationship information expansion apparatus and the like of the present invention, an effect of enabling appropriate expansion of relationship information is obtained, and the present invention is useful as an apparatus for acquiring a new relationship, and the like.

The invention claimed is:

1. A relationship information expansion apparatus stored in a processor comprising:
   a relationship information storage unit in which a relationship information piece including two or more language expressions having a semantic relationship is stored;
   a similarity information storage unit in which two or more similarity information pieces each including two or more similar language expressions are stored;
   a candidate expanded relationship information storage unit in which a candidate expanded relationship information piece, which is the relationship information piece in which at least one language expression was replaced with a similar language expression, is stored;
   a candidate expanded relationship information generation unit for generating a candidate expanded relationship information piece from the relationship information piece stored in the relationship information storage unit by replacing at least one language expression in the relationship information piece with a language expression similar to the at least one language expression, using the similarity information pieces, and accumulating the candidate expanded relationship information piece in the candidate expanded relationship information storage unit;
   a score acquisition unit for acquiring a score that indicates a probability that the candidate expanded relationship information piece stored in the candidate expanded relationship information storage unit has a semantic relationship; and
   a selection unit for selecting, using the score acquired by the score acquisition unit, an expanded relationship information piece, which is a candidate expanded relationship information piece having a high score among candidate expanded relationship information pieces stored in the candidate expanded relationship information storage unit,
   wherein the score acquisition unit calculates a number of replacement which is performed to generate a same candidate expanded relationship information piece from relationship information pieces, and acquires a route score of the candidate expanded relationship information piece, and the route score takes a higher value as the number is higher, and
   wherein the score acquisition unit acquires a co-occurrence score that takes a higher score when the two or more language expressions included in the candidate expanded relationship information piece co-occur with a co-occurring language expression, which is a language expression having a high co-occurrence degree with two or more language expressions included in each relationship information piece having a semantic relationship of the same type as the semantic relationship of the relationship information piece used at the time of generation of the candidate expanded relationship information piece, than when only the two or more language expressions included in the candidate expanded relationship information piece co-occur with one another.

2. The relationship information expansion apparatus according to claim 1,
   wherein the relationship information piece also includes type identification information, which is information for identifying a type of the semantic relationship among the two or more language expressions included in the relationship information piece,
   the candidate expanded relationship information generation unit generates a candidate expanded relationship information piece including the type identification information included in the relationship information piece used to generate the candidate expanded relationship information piece,
   the relationship information expansion apparatus further comprises a correspondence information storage unit in which one or more correspondence information pieces each including the type identification information and one or more co-occurring languages expressions corresponding to the type identification information and corresponding to the type of the semantic relationship identified by the type identification information are stored, and
   the score acquisition unit acquires the co-occurrence score that takes a higher value when the two or more language expressions included in the candidate expanded relationship information piece co-occur with each co-occurring language expression corresponding to the type identification information included in the candidate expanded relationship information piece, than when only the two or more language expressions included in the candidate expanded relationship information piece co-occur with one another.

3. The relationship information expansion apparatus according to claim 1, wherein the score acquisition unit performs machine learning in which a language expression that co-occurs with two or more language expressions included in a group of those two or more language expressions is used at least as a feature, and in which a value of the feature and existence or non-existence of a semantic relationship in the group of the two or more language expressions are used as training data, and acquires a co-occurrence score according to a probability degree, which is an output in a case where the two or more language expressions included in the candidate expanded relationship information piece are input.

4. The relationship information expansion apparatus according to claim 1, wherein the route score is a score that takes a higher value as the candidate expanded relationship information piece is obtained from more relationship information pieces, and takes a higher value as, in the replacement at the time of generation of the candidate expanded relationship information piece, the language expressions before the replacement and the language expression after the replacement are more similar to each other, and
   wherein a relationship information piece and a candidate expanded relationship information piece each includes two language expressions, which are a first language expression and a second language expression,
   the score acquisition unit acquires, for a candidate expanded relationship information piece, a route score, which is a value of an increasing function with an argument that is one or more arbitrary calculated values among a first calculated value, a second calculated value, and a third calculated value, the first calculated value being a sum of similarity degrees between the first language expression in each relationship information piece whose second language expression agrees with that in the candidate expanded relationship information piece and the first language expression in the candidate expanded relationship information piece, the second calculated value being a sum of similarity degrees between the second language expression in each relationship information piece whose first language expression agrees with that in the candidate expanded relationship information piece and the second language expression in the candidate expanded relationship information piece, and the third calculated value being a sum of products of similarity degrees between the first language expression in each relationship information piece stored in the relationship information storage unit and that in the candidate expanded relationship information piece and similarity degrees between the second language expression in each relationship information piece stored in the relationship information storage unit and that in the candidate expanded relationship information piece.

5. The relationship information expansion apparatus according to claim 1,
wherein the relationship information piece also includes type identification information, which is an information piece for identifying a type of the semantic relationship among the two or more language expressions included in the relationship information piece,
the similarity information storage unit stores the type identification information and the similarity information piece corresponding to the type identification information, and
the candidate expanded relationship information generation unit, when replacing at least one language expression included in a relationship information piece stored in the relationship information storage unit, performs replacement using the similarity information corresponding to the type identification information included in the relationship information piece.

6. A method for expanding relationship information processed using a relationship information expansion apparatus including: a relationship information storage unit in which a relationship information piece including two or more language expressions having a semantic relationship is stored; a similarity information storage unit in which two or more similarity information pieces each including two or more similar language expressions are stored;
a candidate expanded relationship information storage unit in which a candidate expanded relationship information piece, which is the relationship information piece in which at least one language expression was replaced with a similar language expression, is stored; a candidate expanded relationship information generation unit; a score acquisition unit; and a selection unit,
the method comprising:
a candidate expanded relationship information generation step in which the candidate expanded relationship information generation unit generates a candidate expanded relationship information piece from the relationship information piece stored in the relationship information storage unit by replacing at least one language expression in the relationship information piece with a language expression similar to the at least one language expression, using the similarity information pieces, and accumulates the candidate expanded relationship information piece in the candidate expanded relationship information storage unit;
a score acquisition step in which the score acquisition unit acquires a score that indicates a probability that the candidate expanded relationship information piece stored in the candidate expanded relationship information storage unit has a semantic relationship; and
a selection step in which the selection unit selects, using the score acquired in the score acquisition step, an expanded relationship information piece, which is a candidate expanded relationship information piece having a high score among candidate expanded relationship information pieces stored in the candidate expanded relationship information storage unit,
wherein the score acquisition step includes
a step of calculating a number of replacement which is performed to generate a same candidate expanded relationship information piece from relationship information pieces, and acquires a route score of the candidate expanded relationship information piece, and the route score takes a higher value as the number is higher, and
a step of acquiring a co-occurrence score that takes a higher score when the two or more language expressions included in the candidate expanded relationship information piece co-occur with a co-occurring language expression, which is a language expression having a high co-occurrence degree with two or more language expressions included in each relationship information piece having a semantic relationship of the same type as the semantic relationship of the relationship information piece used at the time of generation of the candidate expanded relationship information piece, than when only the two or more language expressions included in the candidate expanded relationship information piece co-occur with one another.

7. A non-transitory computer-readable medium tangibly storing a computer program to be executed on a computer, the program for causing the computer to execute:
a candidate expanded relationship information generation step of generating, using similarity information pieces stored in a similarity information storage unit in which two or more similarity information pieces each including two or more similar language expressions are stored and a relationship information piece stored in a relationship information storage unit in which the relationship information piece including two or more language expressions having a semantic relationship is stored, a candidate expanded relationship information piece from the relationship information piece by replacing at least one language expression in the relationship information piece with a language expression similar to the at least one language expression, and accumulating the candidate expanded relationship information piece in a candidate expanded relationship information storage unit in which the candidate expanded relationship information piece is stored,
a score acquisition step in which a score acquisition unit acquires a score that indicates a probability that the candidate expanded relationship information piece stored in the candidate expanded relationship information storage unit has a semantic relationship; and
a selection step of selecting, using the score acquired in the score acquisition step, an expanded relationship information piece, which is a candidate expanded relationship information piece having a high score among candidate expanded relationship information pieces stored in the candidate expanded relationship information storage unit,
wherein the score acquisition step includes
a step of calculating a number of replacement which is performed to generate a same candidate expanded relationship information piece from relationship information pieces, and acquires a route score of the candidate expanded relationship information piece, and the route score takes a higher value as the number is higher, and
a step of acquiring a co-occurrence score that takes a higher score when the two or more language expressions included in the candidate expanded relationship information piece co-occur with a co-occurring language expression, which is a language expression having a high co-occurrence degree with two or more language expressions included in each relationship information piece having a semantic relationship of the same type as the semantic relationship of the relationship information piece used at the time of generation of the candidate expanded relationship information piece, than when only the two or more language expressions included in the candidate expanded relationship information piece co-occur with one another.

* * * * *